United States Patent
Lee et al.

(10) Patent No.: US 10,071,346 B2
(45) Date of Patent: Sep. 11, 2018

(54) THERMALLY REARRANGED POLY(BENZOXAZOLECO-IMIDE) SEPARATION MEMBRANE FOR MEMBRANE DISTILLATION AND FABRICATION METHOD THEREOF

(71) Applicant: IUCF-HYU (INDUSTRY-UNIVERSITY COOPERATION FOUNDATION HANYANG UNIVERSITY), Seoul (KR)

(72) Inventors: Young Moo Lee, Seoul (KR); So Young Lee, Seoul (KR); Ji Hoon Kim, Seoul (KR); Moonjoo Lee, Seoul (KR); Wonhyo Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 14/917,759

(22) PCT Filed: Sep. 3, 2014

(86) PCT No.: PCT/KR2014/008235
§ 371 (c)(1),
(2) Date: Mar. 9, 2016

(87) PCT Pub. No.: WO2015/046774
PCT Pub. Date: Apr. 2, 2015

(65) Prior Publication Data
US 2016/0214065 A1    Jul. 28, 2016

(30) Foreign Application Priority Data

Sep. 26, 2013 (KR) .................. 10-2013-0114285
Aug. 25, 2014 (KR) .................. 10-2014-0110842

(51) Int. Cl.
*B01D 71/64* (2006.01)
*B01D 71/62* (2006.01)
(Continued)

(52) U.S. Cl.
CPC ......... *B01D 71/64* (2013.01); *B01D 67/0083* (2013.01); *B01D 69/02* (2013.01);
(Continued)

(58) Field of Classification Search
None
See application file for complete search history.

(56) References Cited

U.S. PATENT DOCUMENTS 4,828,699 A    5/1989 Soehngen
5,837,032 A *  11/1998 Moll ............... B01D 53/22
                                                  95/45
(Continued)

FOREIGN PATENT DOCUMENTS

| CN | 102203168 | 9/2011 |
| KR | 10-2012-0100920 | 9/2012 |
| WO | 9116123 | 10/1991 |

OTHER PUBLICATIONS

Alkhudhiri, A., et al., "Membrane distillation: A comprehensive review," Desalination, 2012, vol. 287, pp. 2-18.
(Continued)

*Primary Examiner* — Krishnan S Menon
(74) *Attorney, Agent, or Firm* — Duane Morris LLP; J. Rodman Steele, Jr.; Gregory M. Lefkowitz

(57) ABSTRACT

The present invention relates to the production of a hydroxyl polyimide-co-polyimide membrane, the fabrication of a thermally rearranged poly(benzoxazole-co-imide) membrane by thermally treating the hydroxyl polyimide-co-polyimide membrane, and the application of the thermally rearranged poly(benzoxazole-co-imide) membrane to mem-
(Continued)

brane distillation. The thermally rearranged poly(benzoxazole-co-imide) separation membrane has high liquid entry pressure, low thermal conductivity, high permeate flux, and good long-term stability, as well as excellent thermal and chemical properties. Due to these advantages, the copolymer separation membrane can be applied to membrane distillation processes.

18 Claims, 10 Drawing Sheets

(51) Int. Cl.
    *B01D 71/76*     (2006.01)
    *C08G 73/10*     (2006.01)
    *B01D 69/02*     (2006.01)
    *B01D 67/00*     (2006.01)
    *B01D 61/36*     (2006.01)
    *C09D 179/08*     (2006.01)
    *C08G 73/22*     (2006.01)
    *B82Y 30/00*     (2011.01)
    *B82Y 40/00*     (2011.01)

(52) U.S. Cl.
    CPC ............ *B01D 71/76* (2013.01); *C08G 73/105* (2013.01); *C08G 73/1039* (2013.01); *C08G 73/1042* (2013.01); *C08G 73/1071* (2013.01); *C08G 73/22* (2013.01); *C09D 179/08* (2013.01); *B01D 61/364* (2013.01); *B01D 71/62* (2013.01); *B82Y 30/00* (2013.01); *B82Y 40/00* (2013.01)

(56) References Cited

U.S. PATENT DOCUMENTS

2009/0297850 A1* 12/2009 Jung .................. B01D 53/22
                                                                                          428/398
2011/0009506 A1   1/2011   Moo et al.
2011/0065823 A1   3/2011   Moo et al.
2011/0269857 A1  11/2011   Lee et al.
2014/0047976 A1   2/2014   Fong et al.

OTHER PUBLICATIONS

Critchley, J.P., "A review of the poly(azoles)," Prog. Polym. Sci., 1970, vol. 2, pp. 47-161.

Park, H.B., et al., "Polymers with Cavities Tuned for Fast Selective Transport of Small Molecules and Ions," Science, 2007, vol. 318, issue 5848, pp. 254-258.

* cited by examiner

[Fig. 1]
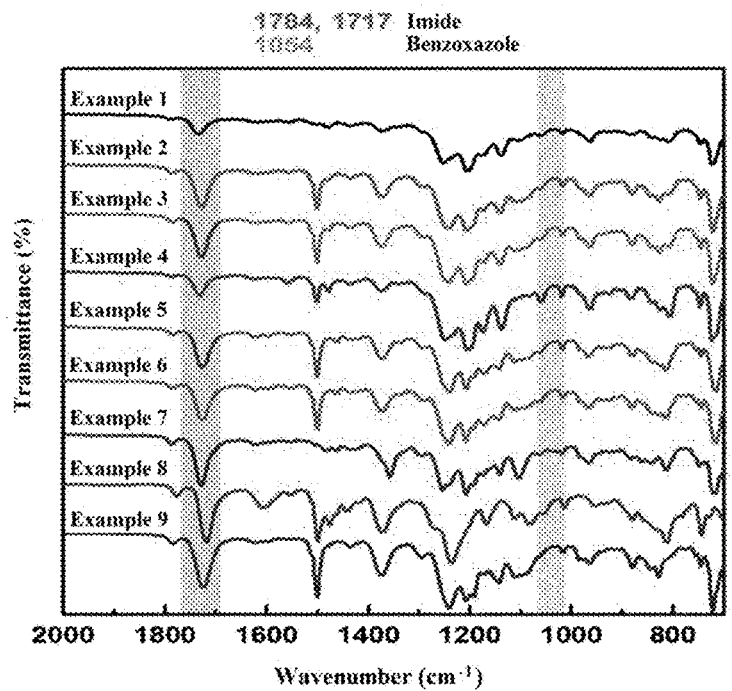
[Fig. 2]
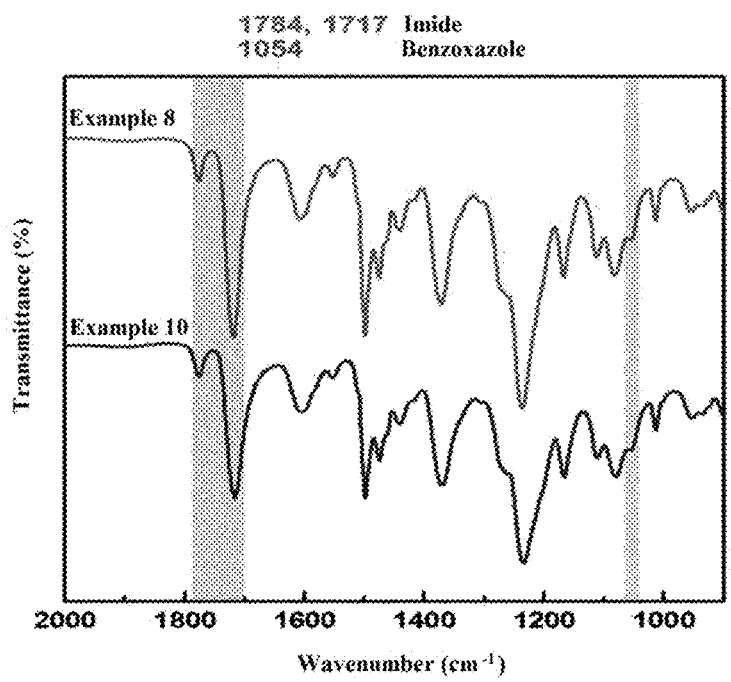

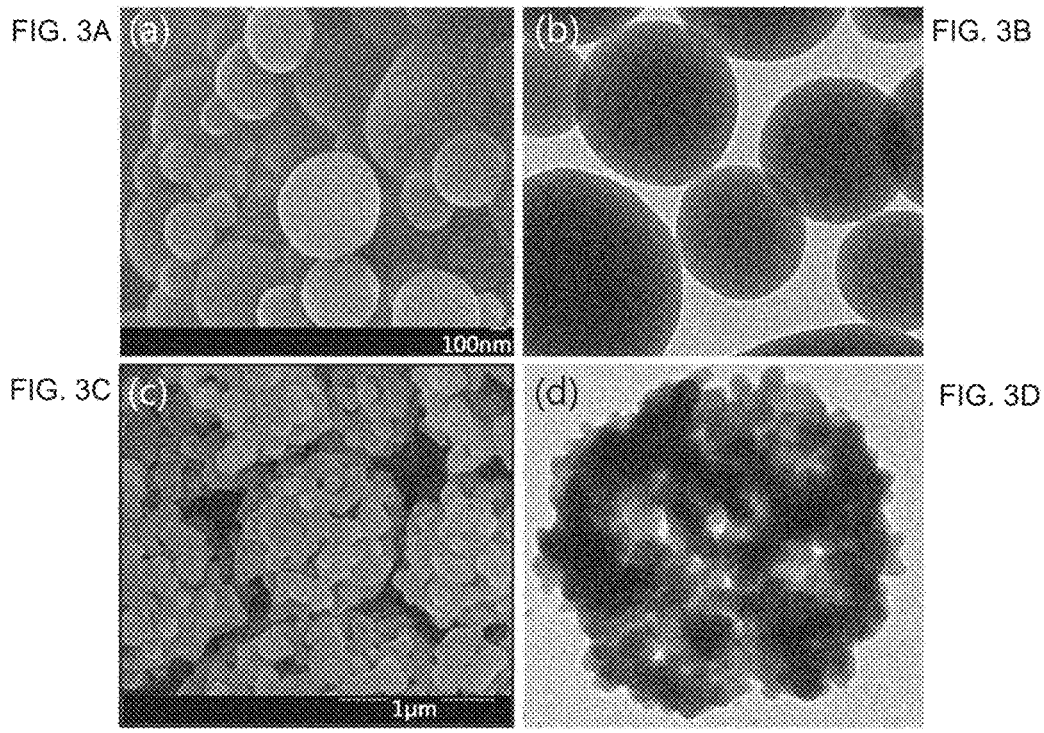
FIG. 3A  FIG. 3B
FIG. 3C  FIG. 3D
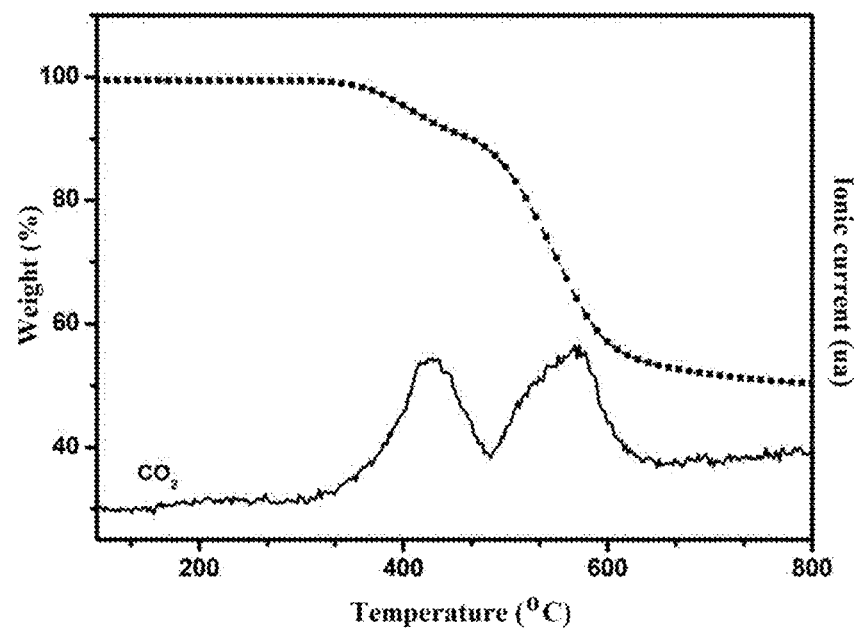
[Fig. 4]

[Fig. 7]
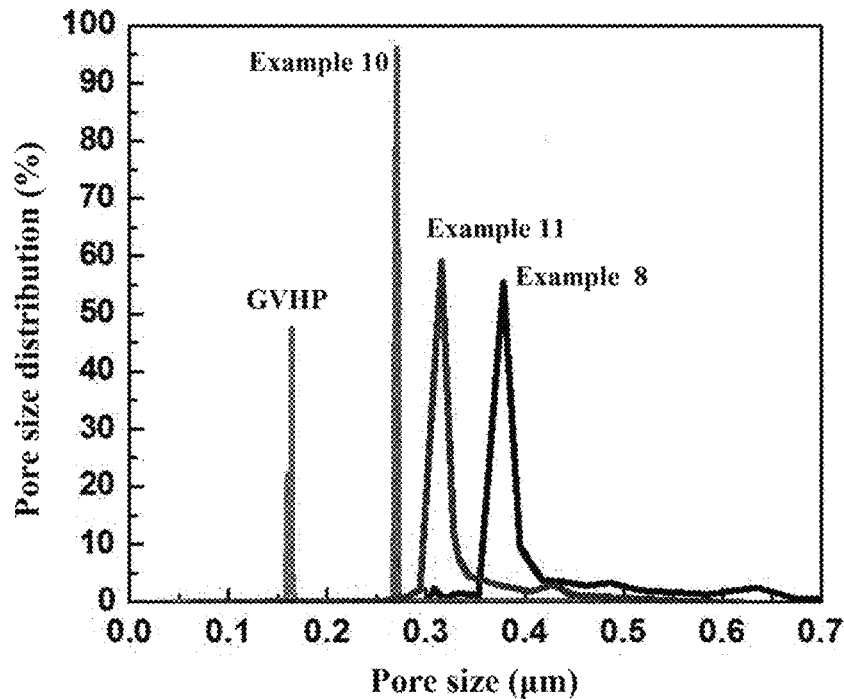
[Fig. 8]
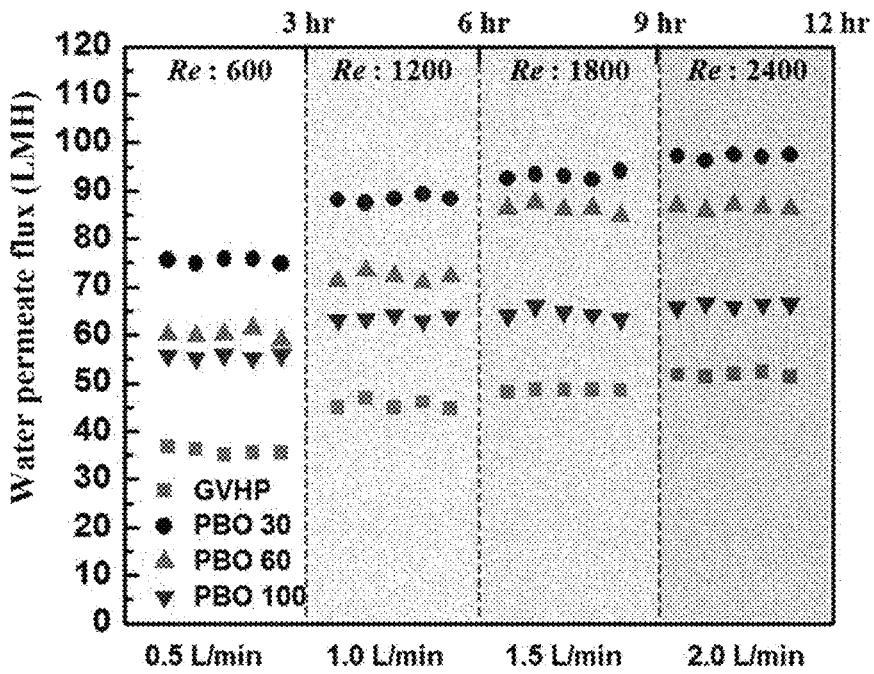

[Fig. 9]
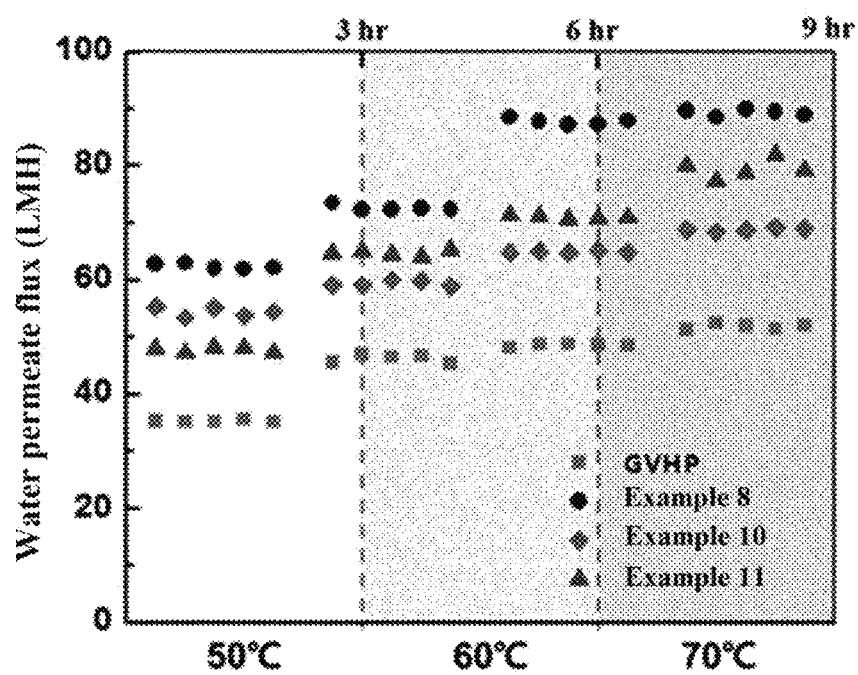

[Fig. 11]
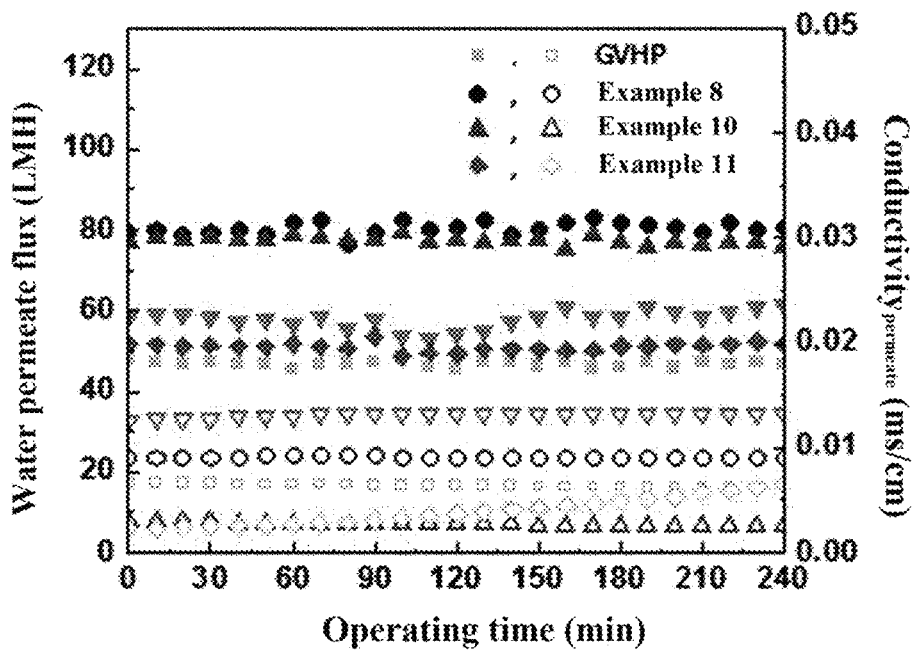
[Fig. 12]
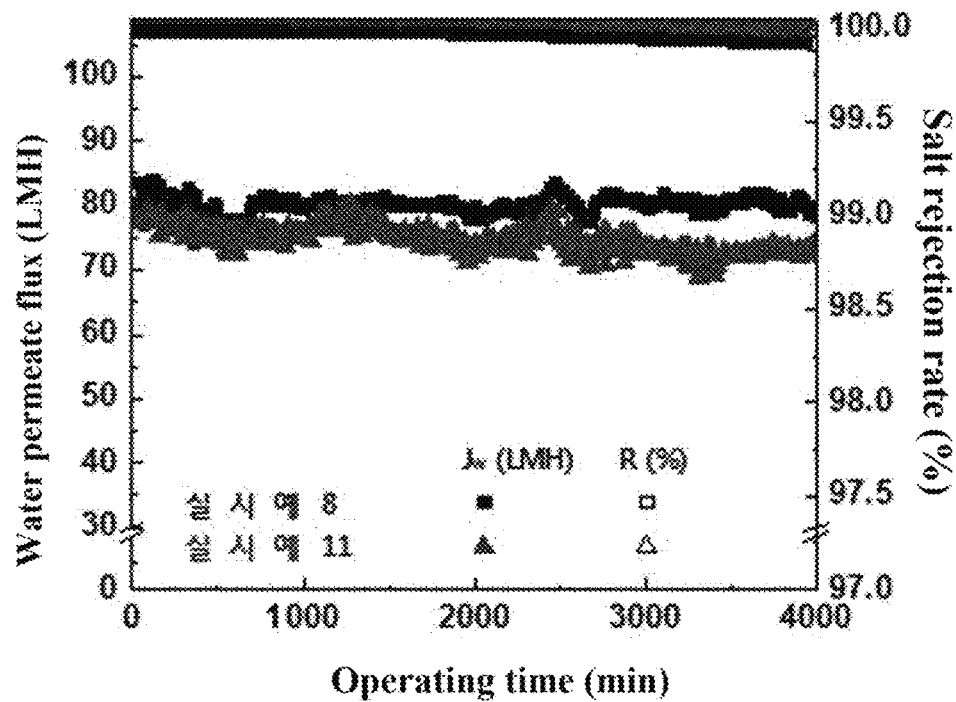

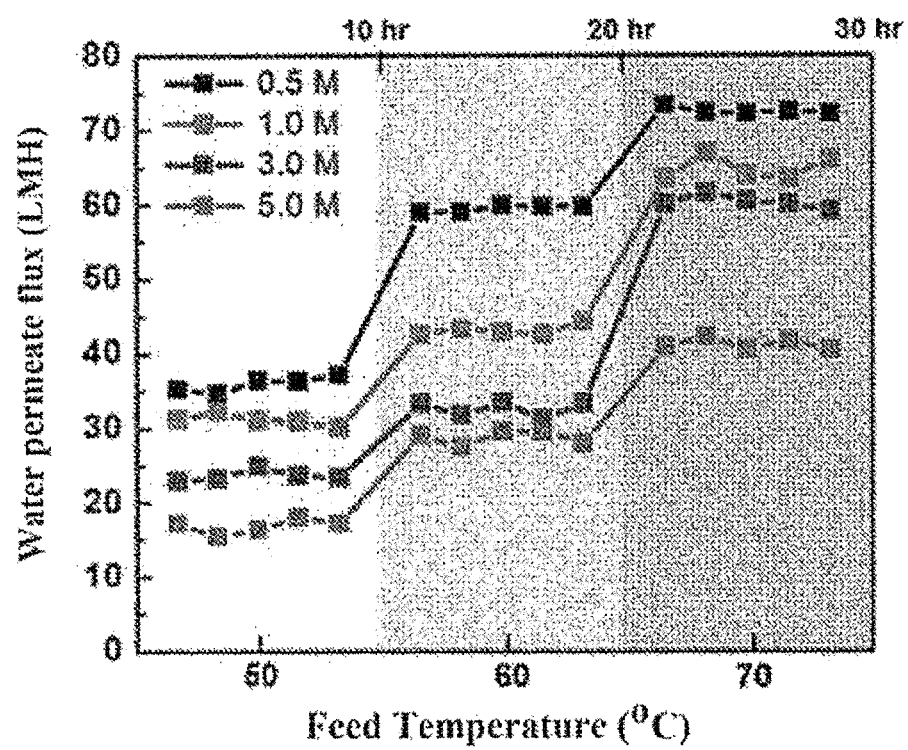
[Fig. 13]

THERMALLY REARRANGED POLY(BENZOXAZOLECO-IMIDE) SEPARATION MEMBRANE FOR MEMBRANE DISTILLATION AND FABRICATION METHOD THEREOF

CROSS-REFERENCE TO RELATED APPLICATIONS

This application is a § 371 national stage entry of International Application No. PCT/KR2014/008235, filed on Sep. 3, 2014, which claims priority to South Korean Patent Application No. 10-2013-0114285, filed on Sep. 26, 2013, and South Korean Patent Application No. 10-2014-0110842, filed on Aug. 25, 2014, the entire contents of which are incorporated herein by reference.

TECHNICAL FIELD

The present invention relates to a thermally rearranged poly(benzoxazole-co-imide) separation membrane for membrane distillation and a method for fabricating the same. More specifically, the present invention relates to the production of a hydroxyl polyimide-co-polyimide membrane, the fabrication of a thermally rearranged poly(benzoxazole-co-imide) membrane by thermally treating the hydroxyl polyimide-co-polyimide membrane, and the application of the thermally rearranged poly(benzoxazole-co-imide) membrane to membrane distillation.

BACKGROUND ART

With increasing population and industrialization over the past two decades, demand and supply for fresh water have increased gradually. Particularly, seawater desalination has been very actively investigated. Membrane distillation has attracted great attention as the most promising process for desalination of highly saline waters.

Membrane distillation is a membrane separation process in which only a particular component (mainly water vapor) in a mixture is able to selectively pass through a porous hydrophobic separation membrane. The driving force in the membrane distillation process for separation and purification of the mixture is the vapor pressure difference between permeable components induced by the temperature difference between both ends of the membrane. This process has various applications, such as wastewater treatment and in the food industry, in addition to seawater desalination.

Such membrane distillation processes are operated at relatively low temperatures in comparison to conventional other distillation processes. Membrane distillation enables the production of fresh water at low cost because it is not a pressure-driven process, unlike reverse osmosis processes. Membrane distillation processes use separation membranes having a smaller pore size than that of separation membranes used in reverse osmosis processes. Accordingly, membrane distillation processes have the advantage that fouling of the membranes can be minimized. However, membrane distillation processes suffer from the disadvantages of relatively low permeate flux and high heat loss during operation due to increased mass transfer resistance, compared to reverse osmosis processes (Non-Patent Document 1).

Thus, separation membranes for membrane distillation are required to have low thermal conductivity and excellent thermal and chemical stability in order to minimize mass transfer resistance and heat loss.

On the other hand, there have been attempts to apply stiff glassy wholly aromatic organic polymers with excellent thermal and chemical properties, such as polybenzoxazole, polybenzimidazole, and polybenzothiazole, to separation membranes (Non-Patent Document 2). However, most of these organic polymers are poorly soluble in general organic solvents. This poor solubility causes difficulties in making membranes by a simple and practical solvent casting method. Only a few membranes using the organic polymers are mostly used for gas separation.

In an effort to overcome such difficulties, a method for fabricating a polybenzoxazole membrane by thermally rearranging a blend membrane of a polyimide having hydroxyl groups in the ortho positions and a poly(styrene sulfonic acid) at 300 to 650° C. (Patent Document 1). However, Patent Document 1 fails to specifically disclose imidization of the hydroxyl polyimide as a precursor for the fabrication of the polybenzoxazole membrane. The applicability of the separation membrane is also limited to gas separation.

The present inventors have also succeeded in fabricating thermally rearranged polybenzoxazole membranes from polyimides having hydroxyl groups in the ortho positions and have also reported that the polybenzoxazole membranes have carbon dioxide permeabilities 10 to 100 times higher than conventional polybenzoxazole membranes fabricated by solvent casting (Non-Patent Document 3).

However, the polybenzoxazole membranes and the thermally rearranged polybenzoxazole membranes described in the prior art documents have limited applicability to gas separation and their applicability to membrane distillation and performance are neither disclosed nor suggested in the above documents and related documents thereof.

In view of this situation, the present inventors have conducted intensive studies to solve the problems of the prior art, and as a result, found that thermally rearranged poly(benzoxazole-co-imide) membranes have excellent thermal and chemical properties and can be fabricated into porous hydrophobic separation membranes for membrane distillation processes in various applications, such as seawater desalination. The present invention has been accomplished based on this finding.

(Patent Document 1) Korean Patent Publication No. 10-2012-0100920

(Non-Patent Document 1) A. Alkhudhiri et al., Desalination 287, 2-18 (2012)

(Non-Patent Document 2) J. P. Critchley, Prog. Polym. Sci. 2, 47-161 (1970)

(Non-Patent Document 3) Y. M. Lee et al., Science 318, 254-258 (2007)

DETAILED DESCRIPTION OF THE INVENTION

Problems to be Solved by the Invention

The present invention has been made in view of the above problems and an object of the present invention is to provide a thermally rearranged poly(benzoxazole-co-imide) separation membrane for membrane distillation that has high liquid entry pressure, low thermal conductivity, high permeate flux, and good long-term stability, as well as excellent thermal and chemical properties, and a method for fabricating the copolymer separation membrane.

Means for Solving the Problems

One aspect of the present invention provides a thermally rearranged poly(benzoxazole-co-imide) separation membrane for membrane distillation, the copolymer being represented by Formula 1:

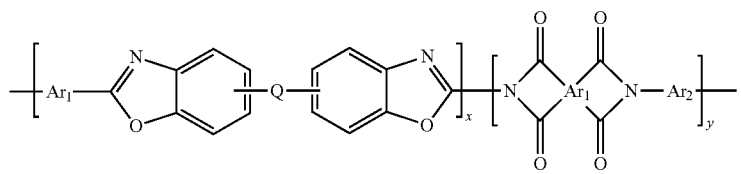

<Formula 1>

(wherein each $Ar_1$ is an aromatic cyclic group selected from substituted or unsubstituted tetravalent $C_6$-$C_{24}$ arylene groups and substituted or unsubstituted tetravalent $C_4$-$C_{24}$ heterocyclic groups, the aromatic cyclic group being a monocyclic or fused aromatic ring, or is a combination of two or more aromatic cyclic groups linked through a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH, $Ar_2$ is an aromatic cyclic group selected from substituted or unsubstituted divalent $C_6$-$C_{24}$ arylene groups and substituted or unsubstituted divalent $C_4$-$C_{24}$ heterocyclic groups, the aromatic cyclic group being a monocyclic or fused aromatic ring, or is a combination of two or more aromatic cyclic groups linked through a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH, Q represents a single bond or is O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$, CO—NH, $C(CH_3)(CF_3)$ or a substituted or unsubstituted phenylene group, and x and y represent the mole fractions of the corresponding repeating units and satisfy 0.1≤x≤0.9, 0.1≤y≤0.9, and x+y=1).

In Formula 1, each $Ar_1$ is selected from the group consisting of the following structures:

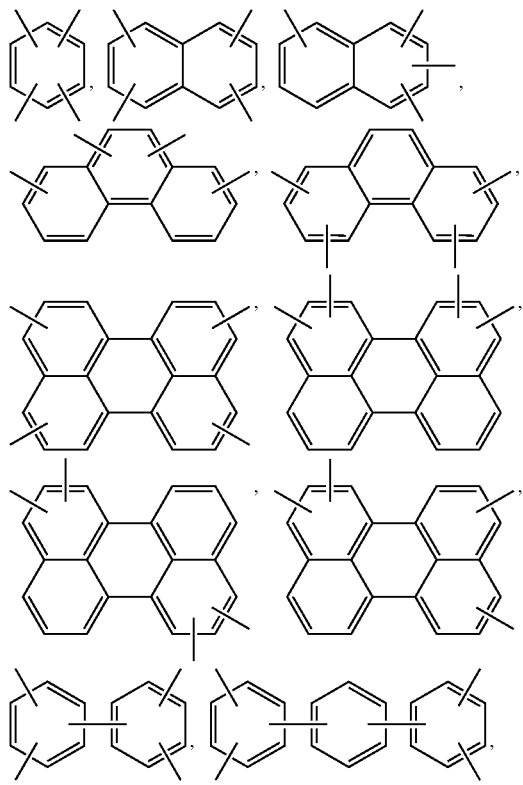

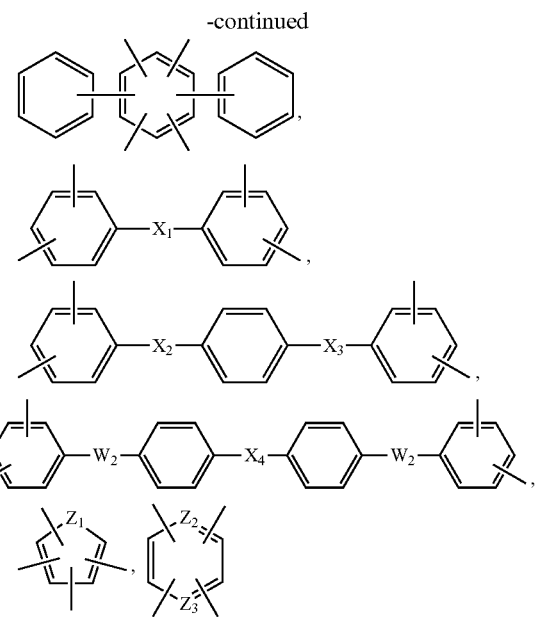

wherein $X_1$, $X_2$, $X_3$, and $X_4$ may be identical to or different from each other and are each independently O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH, $W_1$ and $W_2$ may be identical to or different from each other and are each independently O, S, or CO, $Z_1$ is O, S, $CR_1R_2$ or $NR_3$ (where $R_1$, $R_2$, and $R_3$ may be identical to or different from each other and are each independently hydrogen or $C_1$-$C_5$ alkyl), $Z_2$ and $Z_3$ may be identical to or different from each other and are each independently N or $CR_4$ (where $R_4$ is hydrogen or $C_1$-$C_5$ alkyl), with the proviso that $Z_2$ and $Z_3$ are not simultaneously $CR_4$.

In Formula 1, each $Ar_1$ is selected from the group consisting of the following structures:

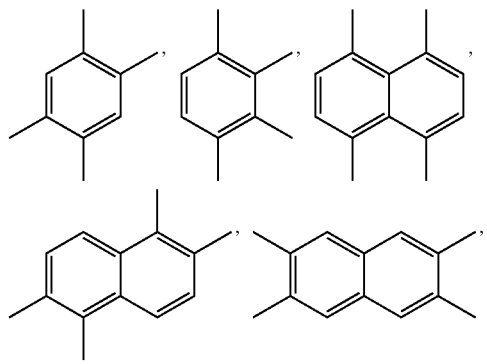

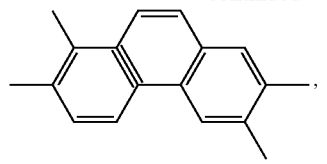
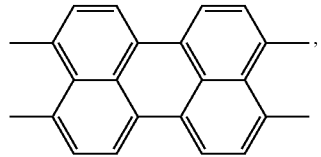
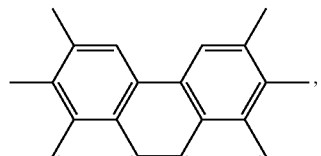
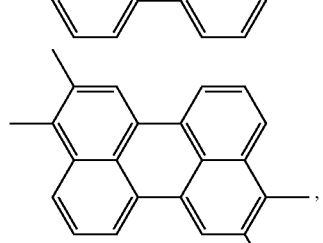
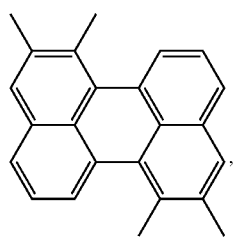
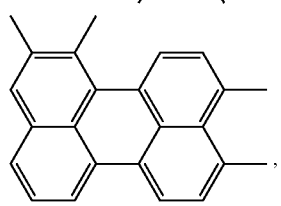
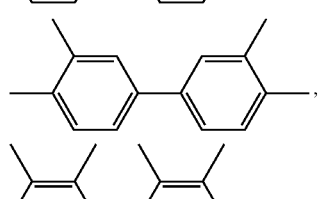
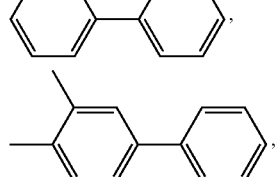
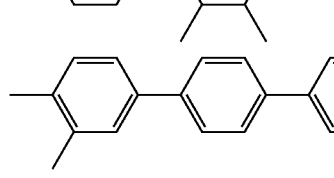
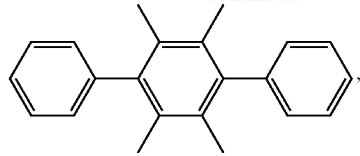
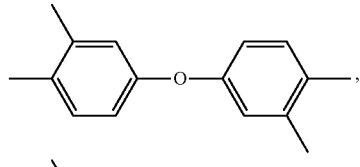
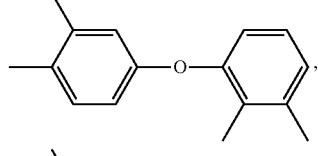
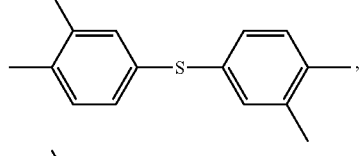
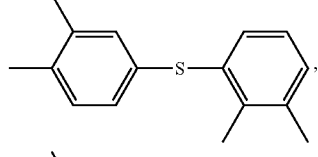
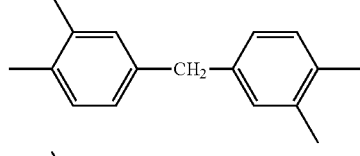
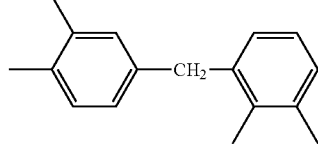
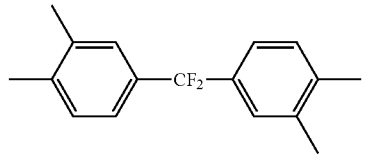
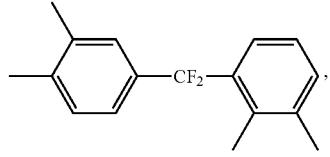
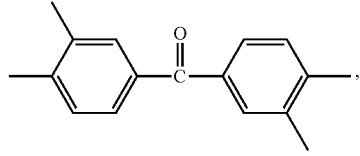
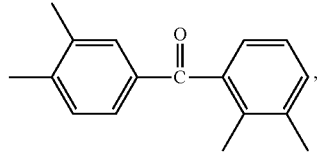

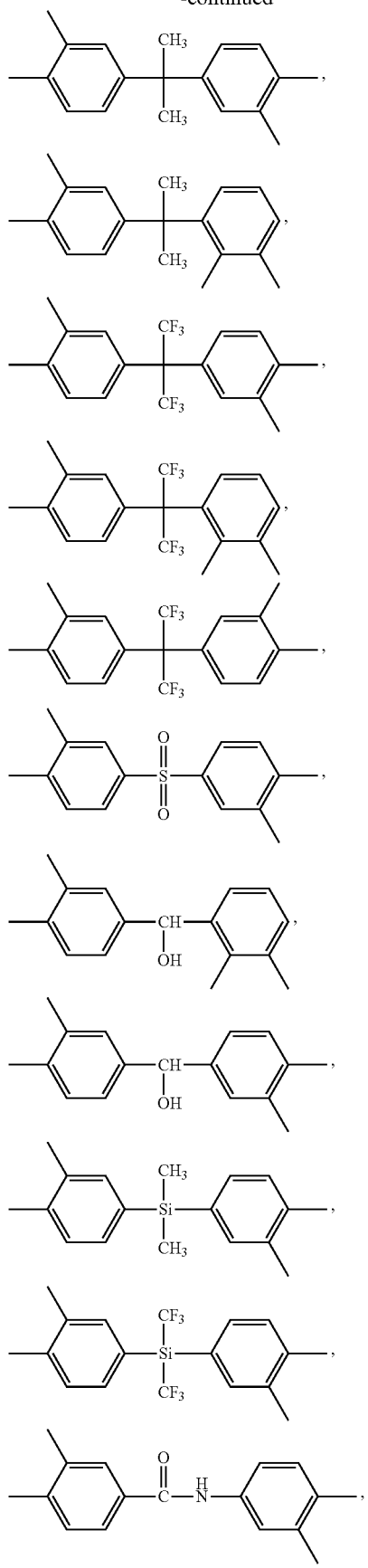
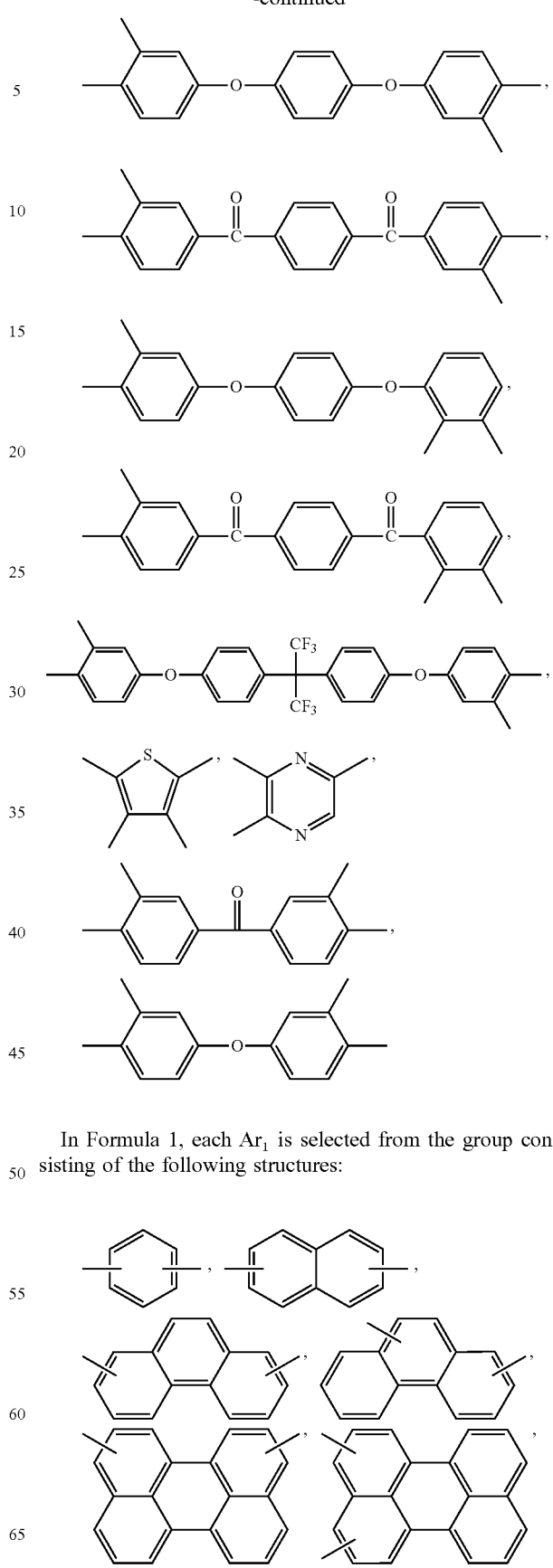
In Formula 1, each $Ar_1$ is selected from the group consisting of the following structures:

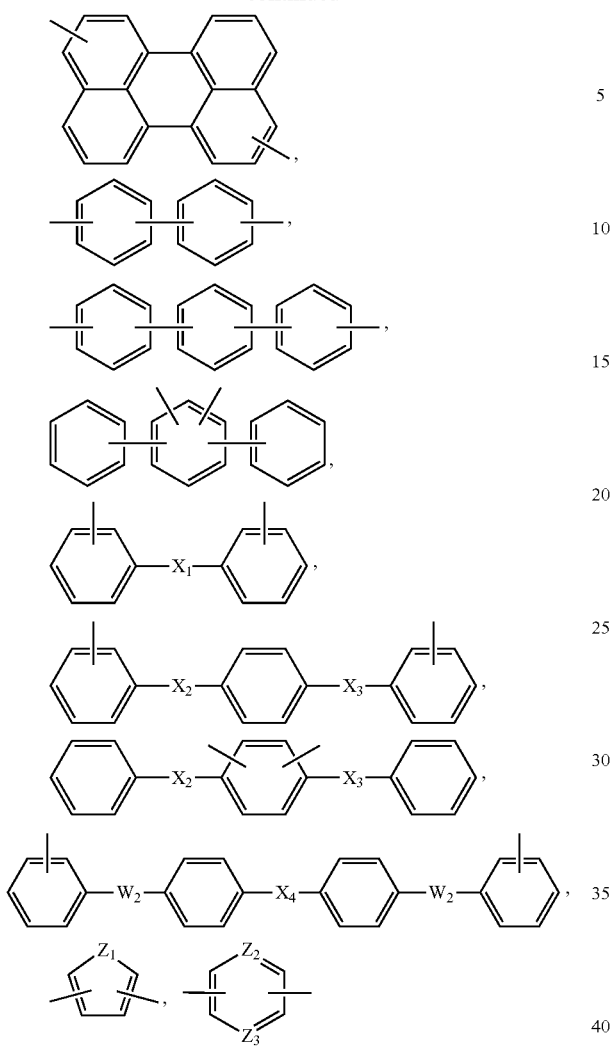

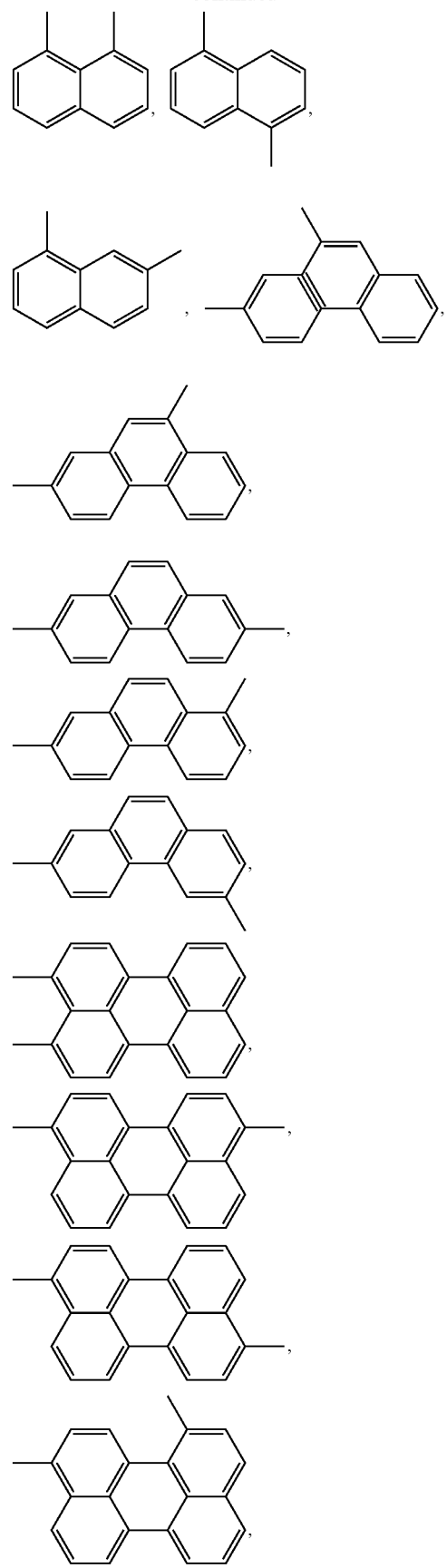

wherein $X_1$, $X_2$, $X_3$, and $X_4$ may be identical to or different from each other and are each independently O, S, CO, $SO_2$, $Si(CH_3)_2$, $(CH_2)_p$ ($1 \le p \le 10$), $(CF_2)_q$ ($1 \le q \le 10$), $C(CH_3)_2$, $C(CF_3)_2$ or CO—NH, $W_1$ and $W_2$ may be identical to or different from each other and are each independently O, S or CO, and $Z_1$ is O, S, $CR_1R_2$ or $NR_3$ (where $R_1$, $R_2$, and $R_3$ may be identical to or different from each other and are each independently hydrogen or $C_1$-$C_5$ alkyl), $Z_2$, and $Z_3$ may be identical to or different from each other and are each independently N or $CR_4$ (where $R_4$ is hydrogen or $C_1$-$C_5$ alkyl), with the proviso that $Z_2$ and $Z_3$ are not simultaneously $CR_4$.

In Formula 1, $Ar_2$ is selected from the group consisting of the following structures:

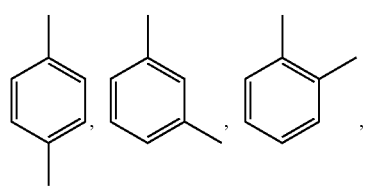

-continued
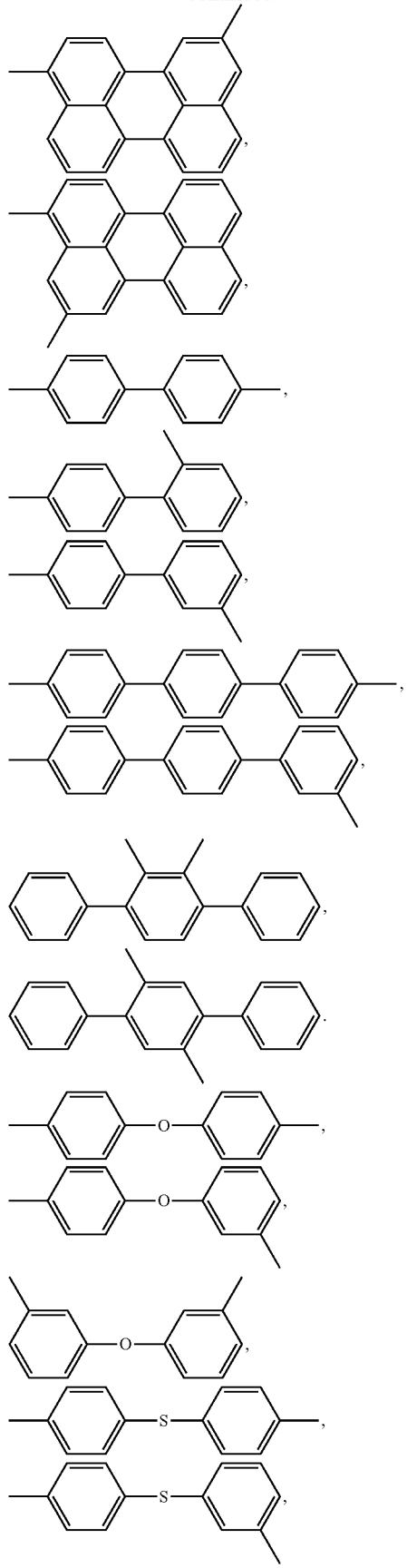
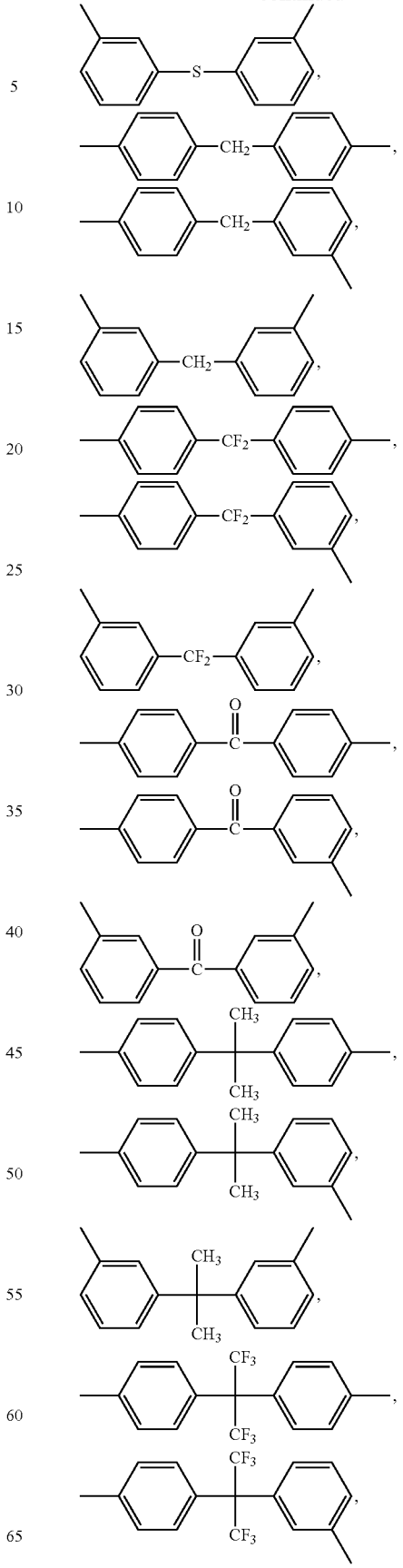

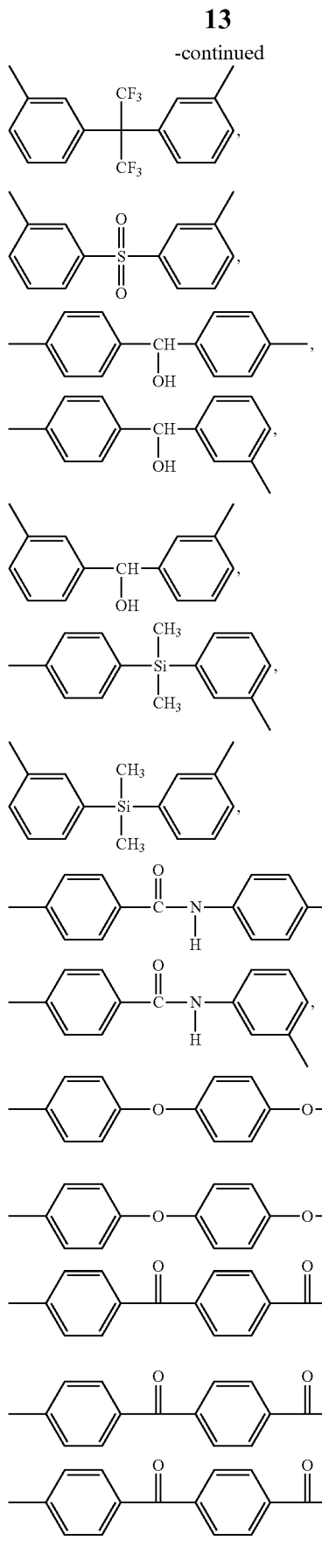

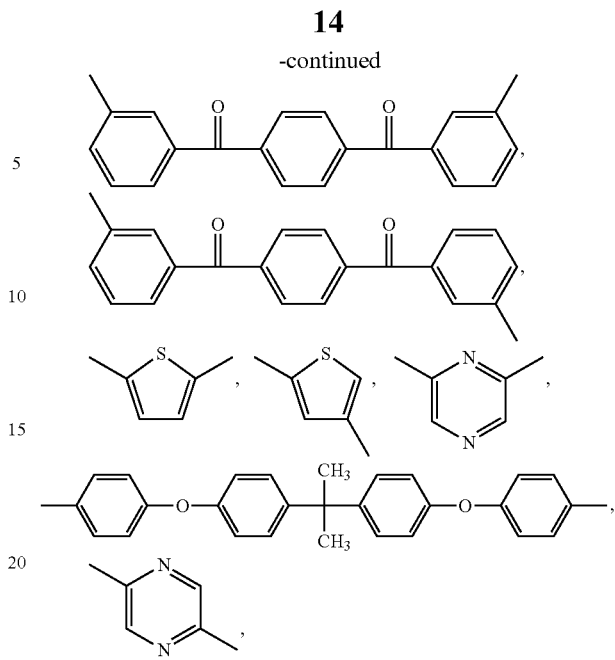

The thermally rearranged poly(benzoxazole-co-imide) separation membrane for membrane distillation may further include a coating layer of hydroxyl polyimide-co-polyimide nanoparticles. In this case, the copolymer separation membrane is in the form of a composite membrane.

The membrane distillation is selected from the group consisting of direct contact membrane distillation, air gap membrane distillation, sweeping gas membrane distillation, and vacuum membrane distillation.

A further aspect of the present invention provides a method for fabricating the thermally rearranged poly(benzoxazole-co-imide) separation membrane for membrane distillation, the method including i) reacting an acid dianhydride, an ortho-hydroxydiamine, and an aromatic diamine to obtain a polyamic acid solution, followed by azeotropic thermal imidization to synthesize a hydroxyl polyimide-co-polyimide, ii) dissolving the hydroxyl polyimide-co-polyimide in an organic solvent and electrospinning the polymer solution to obtain a hydroxyl polyimide-co-polyimide membrane, and iii) thermally rearranging the hydroxyl polyimide-co-polyimide membrane.

The ortho-hydroxydiamine used in step i) is represented by Formula 3:

<Formula 3>

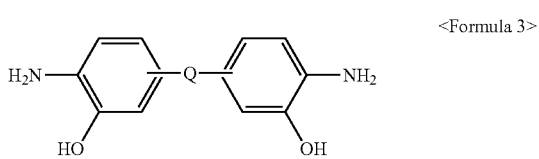

(wherein Q is as defined in Formula 1).

In step i), the azeotropic thermal imidization is carried out in such a manner that toluene or xylene is added to the polyamic acid solution and the polyamic acid is subjected to an imidization reaction with stirring at 180 to 200° C. for 6 to 8 hours.

The method further includes forming a coating layer of hydroxyl polyimide-co-polyimide nanoparticles after step ii).

The hydroxyl polyimide-co-polyimide nanoparticles are formed by dissolving a hydroxyl polyimide-co-polyimide and polyvinylpyrrolidone (PVP) or polyvinyl alcohol (PVA) as a dispersant in a solvent to obtain a polymer solution, dropping a non-solvent into the polymer solution, stirring the mixture, and depositing precipitates.

The solvent is selected from the group consisting of N-methylpyrrolidone (NMP), dimethylacetamide (DMAc), dimethylformamide (DMF), and dimethyl sulfoxide (DMSO).

The non-solvent is selected from the group consisting of water, methanol, ethanol, isopropyl alcohol, and acetone.

The polymer solution contains 2 to 5% by weight of the hydroxyl polyimide-co-polyimide.

The polymer solution contains 2 to 5% by weight of the polyvinylpyrrolidone (PVP) or polyvinyl alcohol (PVA).

The non-solvent is dropped at a rate of 0.05 to 1 mL/min.

The stirring rate is adjusted to 300 to 1,000 rpm.

The hydroxyl polyimide-co-polyimide nanoparticles are formed at 20 to 100° C.

The coating layer is formed by spray coating.

In step iii), the thermal rearrangement is performed by heating the hydroxyl polyimide-co-polyimide membrane to 350 to 450° C. at a rate of 3° C./min in a high-purity argon atmosphere and maintaining the temperature for 1 to 2 hours.

Effects of the Invention

The thermally rearranged poly(benzoxazole-co-imide) separation membrane of the present invention has high liquid entry pressure, low thermal conductivity, high permeate flux, and good long-term stability, as well as excellent thermal and chemical properties. Due to these advantages, the copolymer separation membrane of the present invention can be applied to membrane distillation processes.

BRIEF DESCRIPTION OF THE DRAWINGS

FIG. 1 shows ATR-IR spectra of thermally rearranged poly(benzoxazole-co-imide) separation membranes fabricated in Examples 1 to 9.

FIG. 2 shows an ATR-IR spectrum of a thermally rearranged poly(benzoxazole-co-imide) separation membrane in the form of a composite membrane including a coating layer, which was fabricated in Example 10.

FIG. 3A shows scanning electron microscopy (SEM) image of hydroxyl polyimide-co-polyimide nanoparticles produced in Production Example 1.

FIG. 3B shows transmission electron microscopy (TEM) image of hydroxyl polyimide-co-polyimide nanoparticles of the copolymer nanoparticles produced in Production Example 1.

FIG. 3C shows scanning electron microscopy (SEM) image of hydroxyl polyimide-co-polyimide nanoparticles of the copolymer nanoparticles produced in Production Example 2.

FIG. 3D shows transmission electron microscopy (TEM) image of hydroxyl polyimide-co-polyimide nanoparticles of the copolymer nanoparticles produced in Production Example 2.

FIG. 4 is a thermogravimetry-mass spectrum (TG-MS) of a copolymer (6FDA-APAF$_2$-ODA$_8$) membrane fabricated in Example 1, showing the thermal weight loss of the copolymer membrane.

FIG. 7 shows the pore sizes and pore size distributions of a thermally rearranged poly(benzoxazole-co-imide) separation membrane fabricated in Example 8 and thermally rearranged poly(benzoxazole-co-imide) separation membranes fabricated in Examples 10 and 11, each of which includes a coating layer.

FIG. 8 shows the permeate fluxes of thermally rearranged poly(benzoxazole-co-imide) separation membranes (sample name PBO) with different thicknesses fabricated in Example 8, which were measured at various flow rates.

FIG. 9 shows the permeate fluxes of a 60 μm thick thermally rearranged poly(benzoxazole-co-imide) separation membrane in the form of a monolayer membrane fabricated in Example 8, 60 μm thick thermally rearranged poly(benzoxazole-co-imide) separation membranes in the form of composite membranes fabricated in Examples 10 and 11, and a 125 μm thick commercial membrane (GVHP), which were measured at various temperatures.

FIG. 11 shows the salt rejection rates of a 60 μm thick thermally rearranged poly(benzoxazole-co-imide) separation membrane in the form of a monolayer membrane fabricated in Example 8, 60 μm thick thermally rearranged poly(benzoxazole-co-imide) separation membranes in the form of composite membranes fabricated in Examples 10 and 11, and a 125 μm thick commercial membrane (GVHP).

FIG. 12 shows the long-term stabilities of a porous thermally rearranged poly(benzoxazole-co-imide) separation membrane in the form of a monolayer membrane fabricated in Example 8 and a composite membrane including a porous coating layer fabricated in Example 11.

FIG. 13 shows the direct contact membrane distillation (DCMD) stabilities and water permeabilities of a porous thermally rearranged poly(benzoxazole-co-imide) separation membrane in the form of a monolayer membrane fabricated in Example 8, which were measured using 1, 3, and 5 M aqueous NaCl solutions.

BEST MODE FOR CARRYING OUT THE INVENTION

Figure 5A:
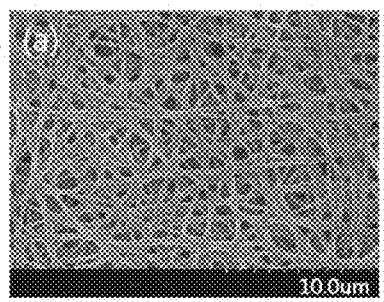
FIG. 5A shows a scanning electron microscopy (SEM) image of a thermally rearranged poly(benzoxazole-co-imide) separation membrane fabricated in Example 8, of which includes a coating layer.

The present invention provides a thermally rearranged poly(benzoxazole-co-imide) separation membrane for membrane distillation, the copolymer being represented by Formula 1:

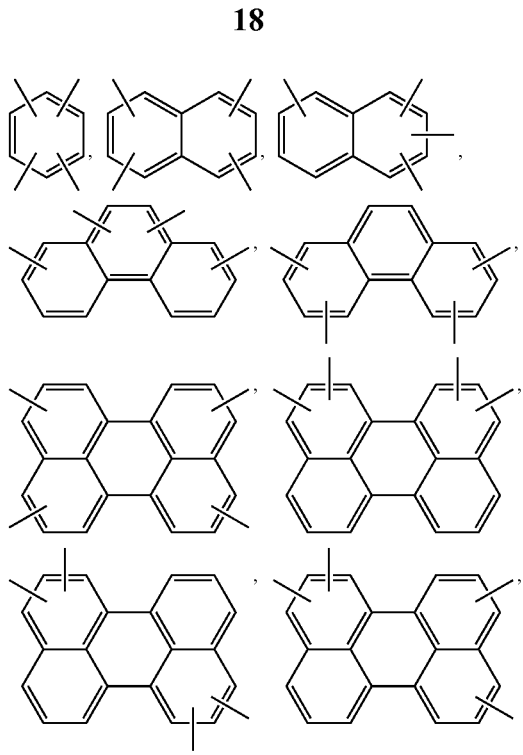

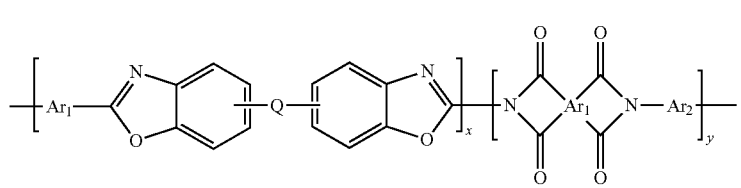

<Formula 1>

(wherein each $Ar_1$ is an aromatic cyclic group selected from substituted or unsubstituted tetravalent $C_6$-$C_{24}$ arylene groups and substituted or unsubstituted tetravalent $C_4$-$C_{24}$ heterocyclic groups, the aromatic cyclic group being a monocyclic or fused aromatic ring, or is a combination of two or more aromatic cyclic groups linked through a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH. $Ar_2$ is an aromatic cyclic group selected from substituted or unsubstituted divalent $C_6$-$C_{24}$ arylene groups and substituted or unsubstituted divalent $C_4$-$C_{24}$ heterocyclic groups, the aromatic cyclic group being a monocyclic or fused aromatic ring, or is a combination of two or more aromatic cyclic groups linked through a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH, Q represents a single bond or is O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$, CO—NH, $C(CH_3)(CF_3)$ or a substituted or unsubstituted phenylene group, and x and y represent the mole fractions of the corresponding repeating units and satisfy 0.1≤x≤0.9, 0.1≤y≤0.9, and x+y=1).

In Formula 1, each $Ar_1$ may be selected from the group consisting of the following structures:

-continued

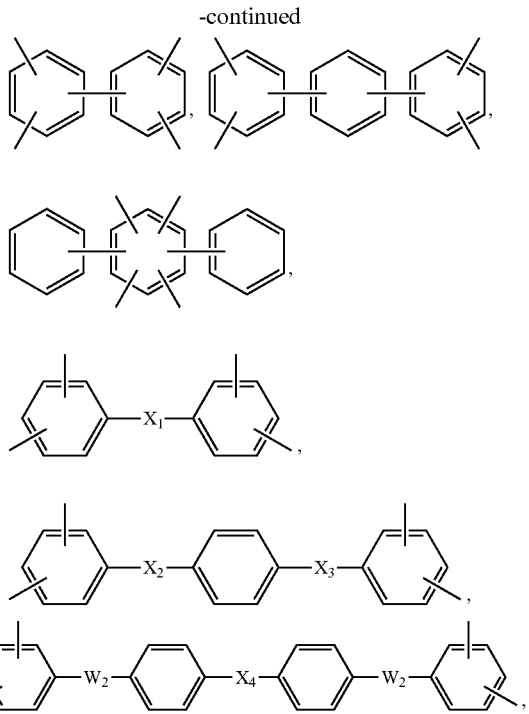

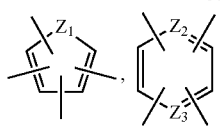

wherein $X_1$, $X_2$, $X_3$, and $X_4$ may be identical to or different from each other and are each independently O, S, CO, $SO_2$, $Si(CH_3)_2$, $(CH_2)_p$, ($1 \leq p \leq 10$), $(CF_2)_q$ ($1 \leq q \leq 10$), $C(CH_3)_2$, $C(CF_3)_2$ or CO—NH, $W_1$ and $W_2$ may be identical to or different from each other and are each independently O, S, or CO, $Z_1$ is O, S, $CR_1R_2$ or $NR_3$ (where $R_1$, $R_2$, and $R_3$ may be identical to or different from each other and are each independently hydrogen or $C_1$-$C_5$ alkyl), $Z_2$ and $Z_3$ may be identical to or different from each other and are each independently N or $CR_4$ (where $R_4$ is hydrogen or $C_1$-$C_5$ alkyl), with the proviso that $Z_2$ and $Z_3$ are not simultaneously $CR_4$.

Specific examples of preferred structures of $Ar_1$ include:

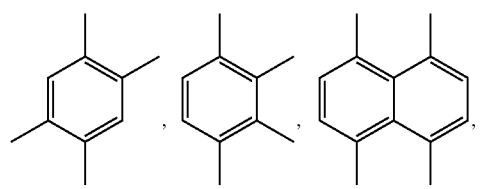

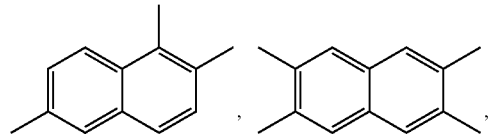

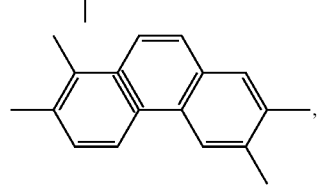

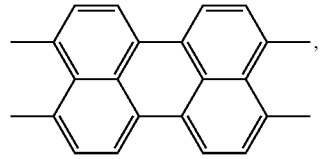

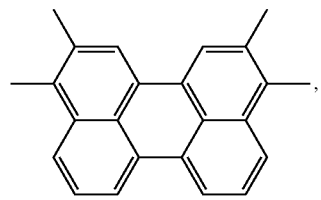

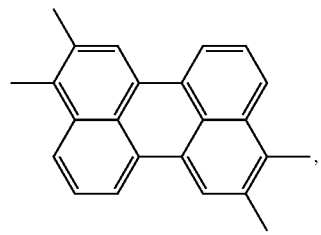

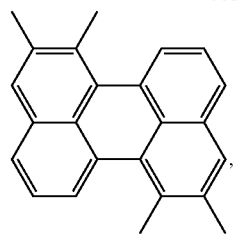

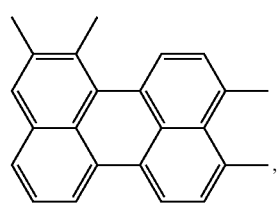

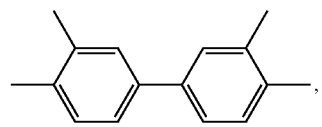

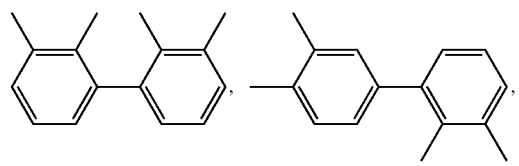

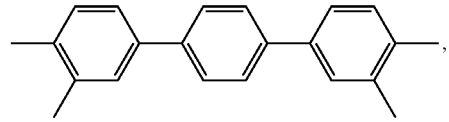

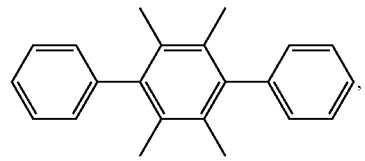

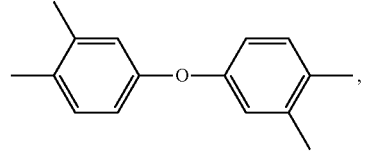

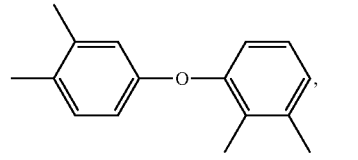

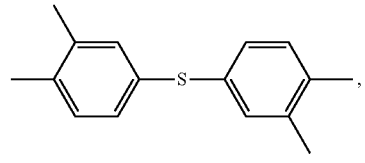

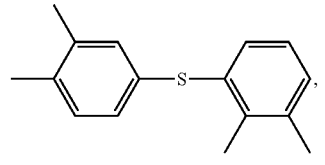

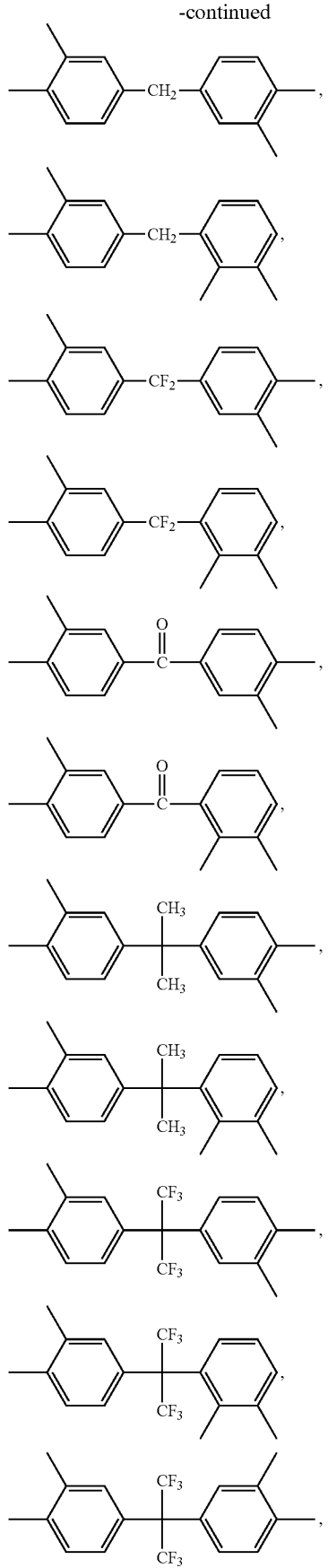
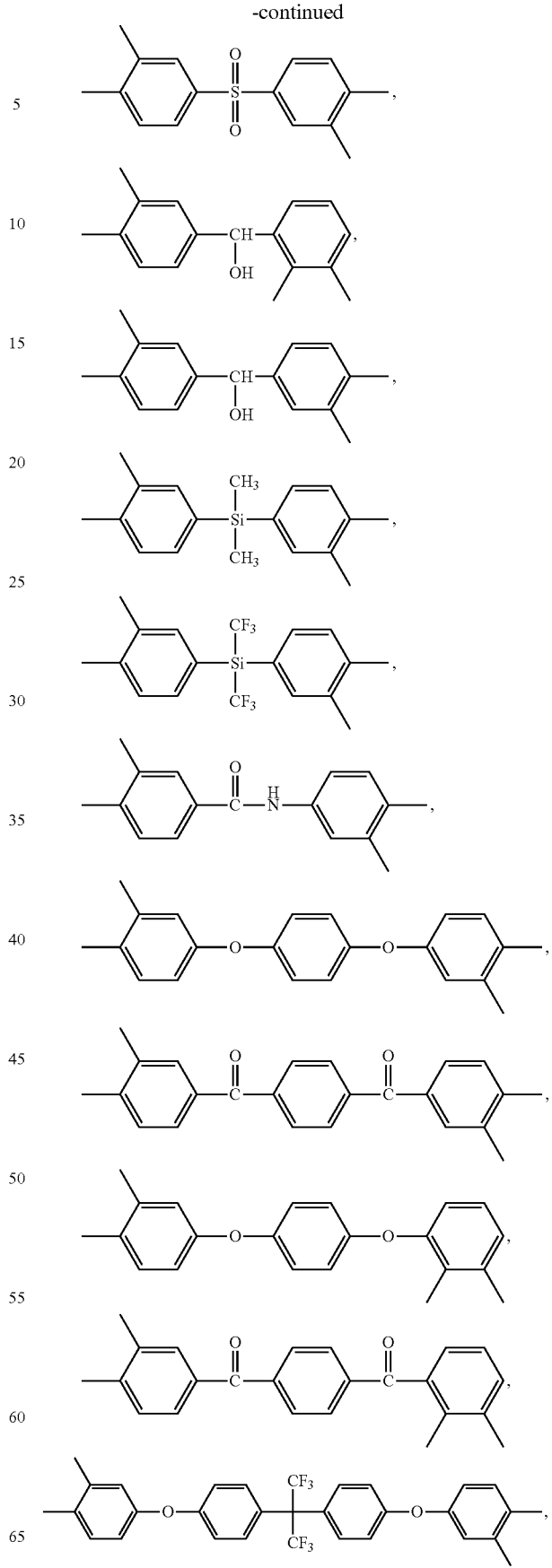

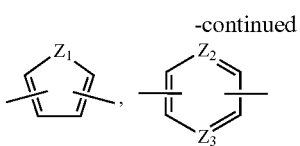

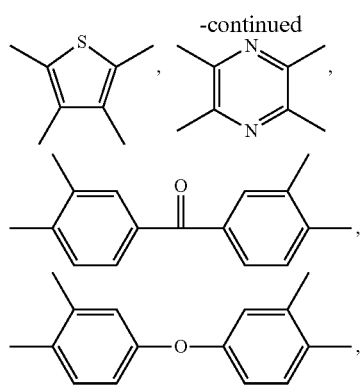

In Formula 1, Ar$_2$ may be selected from the group consisting of the following structures:

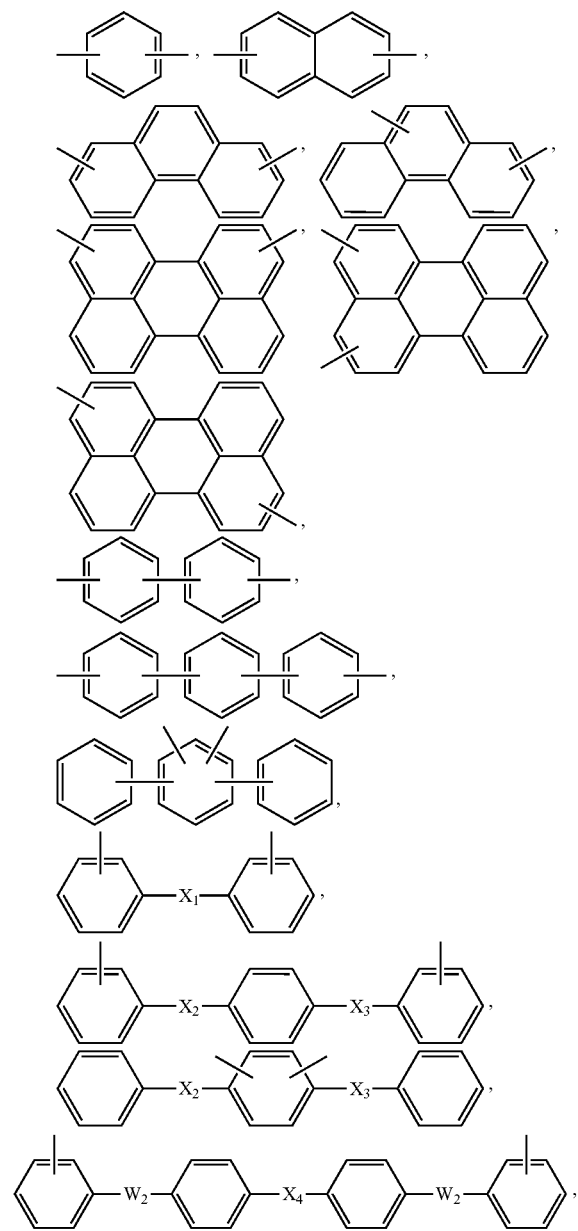

wherein $X_1$, $X_2$, $X_3$, and $X_4$ may be identical to or different from each other and are each independently O, S, CO, SO$_2$, Si(CH$_3$)$_2$, (CH$_2$)$_p$ ($1 \leq p \leq 10$), (CF$_2$)$_q$ ($1 \leq q \leq 10$), C(CH$_3$)$_2$, C(CF$_3$)$_2$ or CO—NH. $W_1$ and $W_2$ may be identical to or different from each other and are each independently O, S or CO, and $Z_1$ is O, S, CR$_1$R$_2$ or NR$_3$ (where R$_1$, R$_2$, and R$_3$ may be identical to or different from each other and are each independently hydrogen or C$_1$-C$_5$ alkyl), $Z_2$ and $Z_3$ may be identical to or different from each other and are each independently N or CR$_4$ (where R$_4$ is hydrogen or C$_1$-C$_5$ alkyl), with the proviso that $Z_2$ and $Z_3$ are not simultaneously CR$_4$.

Specific examples of preferred structures of Ar$_2$ include:

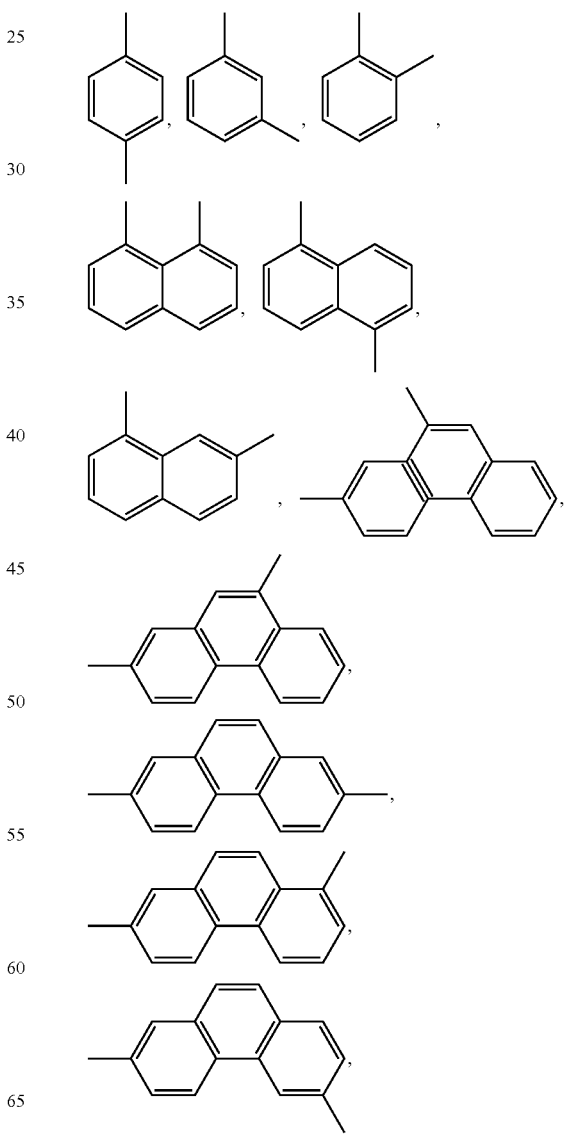

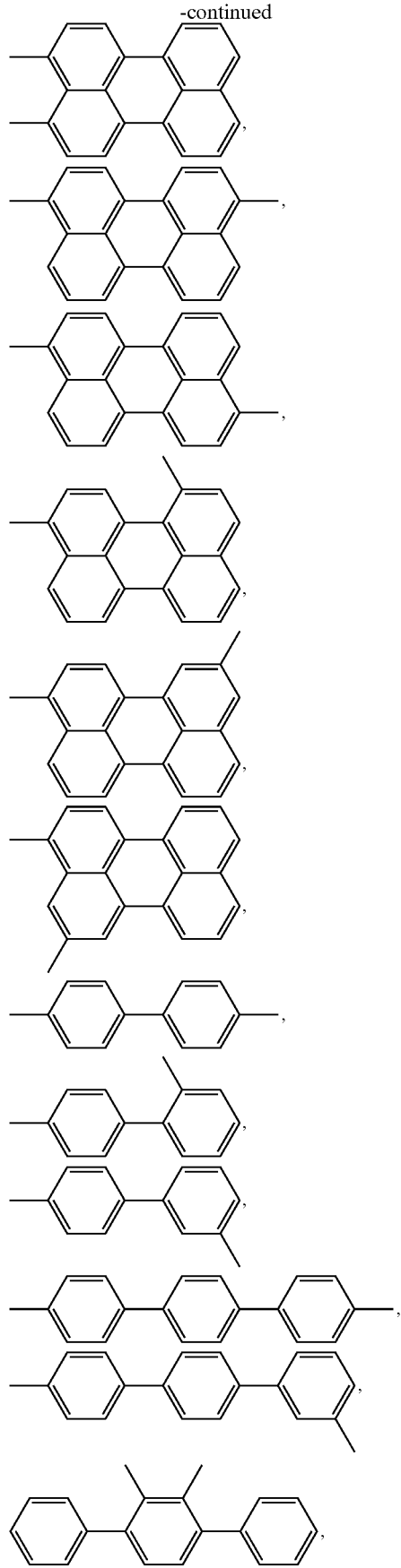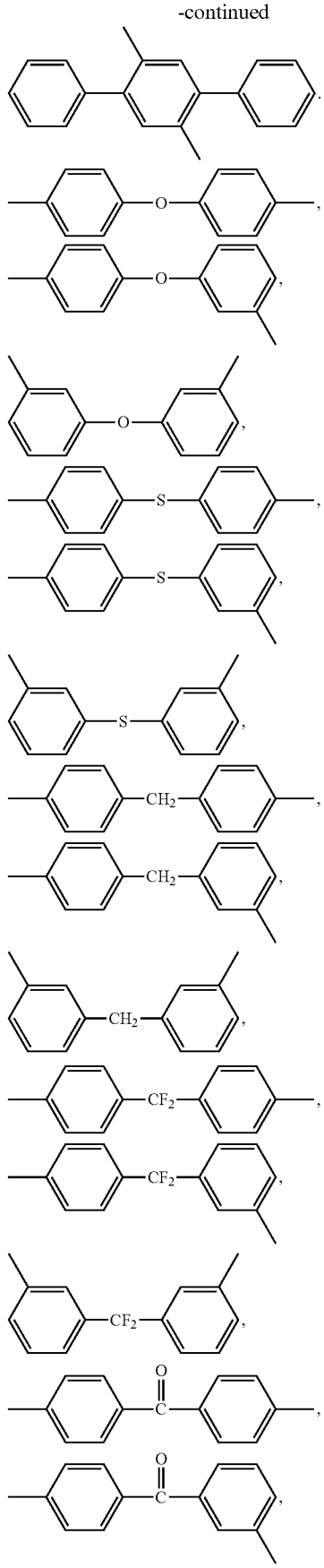

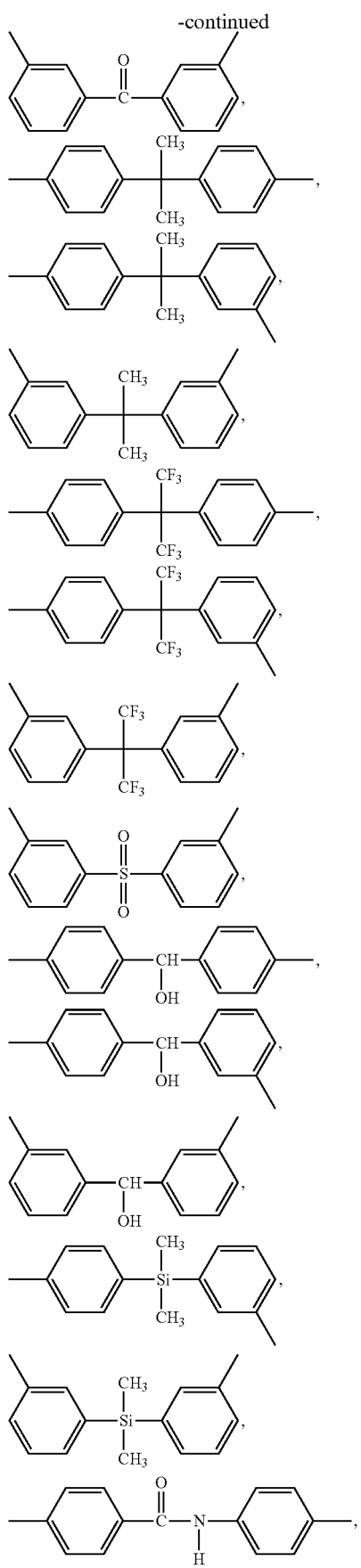

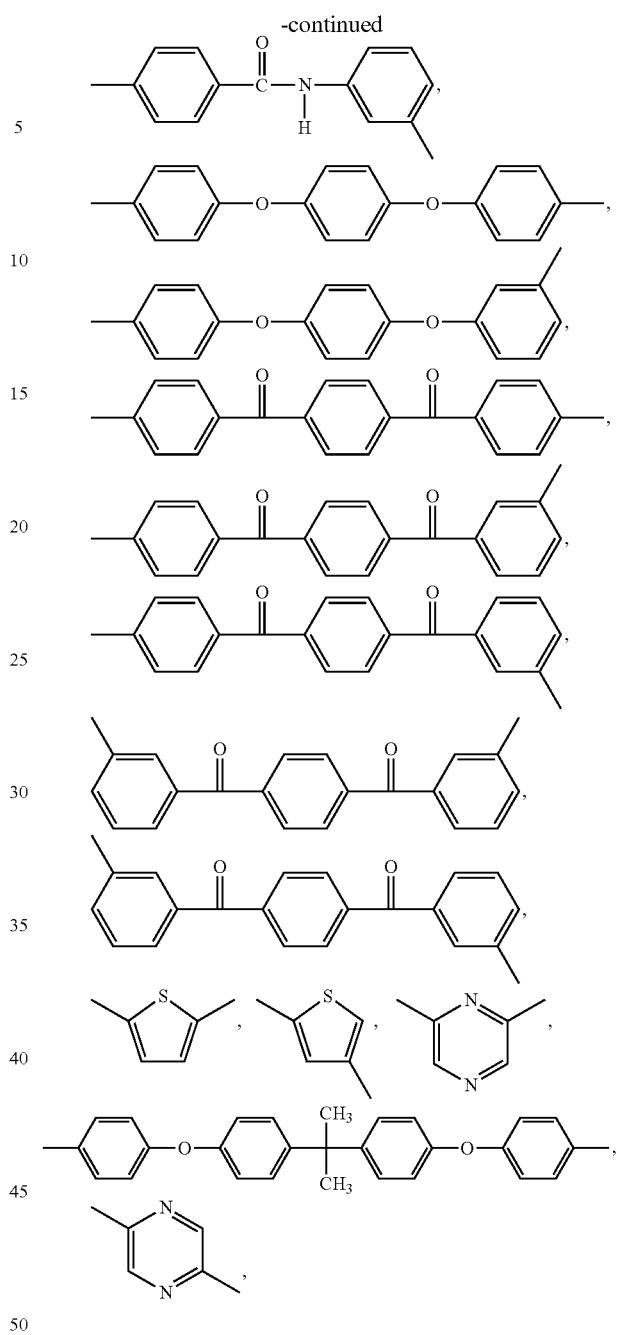

The thermally rearranged poly(benzoxazole-co-imide) separation membrane for membrane distillation may further include a coating layer of hydroxyl polyimide-co-polyimide nanoparticles. In this case, the copolymer separation membrane is in the form of a composite membrane.

Generally, the formation of the nanoparticle coating layer on an electrospun membrane decreases the pore size of the membrane and increases the surface roughness, leading to increased hydrophobicity and liquid entry pressure (LEPw) of the composite membrane. As a result, the surface energy and wettability of the membrane are reduced, eventually resulting in a marked improvement in membrane distillation performance, including salt rejection rate.

Accordingly, the thermally rearranged poly(benzoxazole-co-imide) separation membrane of the present invention can be applied to membrane distillation processes. Membrane distillation processes can be classified into direct contact membrane distillation (DCMD), air gap membrane distillation (AGMD), sweeping gas membrane distillation (SGMD), and vacuum membrane distillation (VMD) according to how to induce a difference in vapor pressure acting as a driving force. The thermally rearranged poly(benzoxazole-co-imide) separation membrane of the present invention can be applied without limitation to any particular type of membrane distillation process but is preferably applied to direct contact membrane distillation processes taking into consideration the ease of setup and manipulation and its permeate flux.

The structure of the poly(benzoxazole-co-imide) represented by Formula 1 is based on the synthesis of a polyimide by imidization of a polyamic acid as a reaction product of an acid dianhydride and a diamine. Functional groups, such as hydroxyl groups, ortho to the aromatic imide linking rings attack the carbonyl groups of the imide rings to form an intermediate having a carboxy-benzoxazole structure, which is decarboxylated by subsequent thermal treatment to synthesize the thermally rearranged polybenzoxazole. Based on this mechanism, the thermally rearranged poly(benzoxazole-co-imide) separation membrane of the present invention is fabricated by the following method.

Specifically, the present invention provides a method for fabricating the thermally rearranged poly(benzoxazole-co-imide) separation membrane for membrane distillation, including i) reacting an acid dianhydride, an ortho-hydroxydiamine, and an aromatic diamine to obtain a polyamic acid solution, followed by azeotropic thermal imidization to synthesize a hydroxyl polyimide-co-polyimide, ii) dissolving the hydroxyl polyimide-co-polyimide in an organic solvent and electrospinning the polymer solution to obtain a hydroxyl polyimide-co-polyimide membrane, and iii) thermally rearranging the hydroxyl polyimide-co-polyimide membrane.

First, an acid dianhydride is allowed to react with a diamine to obtain a polyamic acid for the synthesis of a polyimide. As the acid dianhydride, there can be used a compound represented by Formula 2:

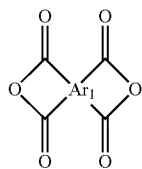

<Formula 2>

(wherein $Ar_1$ is as defined in Formula 1).

Any acid dianhydride defined in Formula 2 may be used without limitation as a monomer for the synthesis of a polyimide. Preferably, the acid dianhydride is 4,4'-hexafluoroisopropylidene phthalic dianhydride (6FDA) having fluorine groups or 4,4'-oxydiphthalic dianhydride (ODPA) that can further improve the thermal and chemical properties of a polyimide.

Based on the finding that polybenzoxazole units can be introduced into the final poly(benzoxazole-co-imide) structure by thermal rearrangement of an ortho-hydroxyl polyimide, as an ortho-hydroxyl diamine for the synthesis of the ortho-hydroxyl polyimide, there can be used a compound represented by Formula 3:

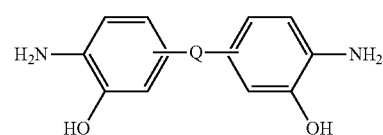

<Formula 3>

(wherein Q is as defined in Formula 1).

Any ortho-hydroxydiamine defined in Formula 3 may be used without limitation. Preferably, the ortho-hydroxydiamine is 2,2-bis(3-amino-4-hydroxyphenyl)hexafluoropropane (APAF) or 3,3'-diamino-4,4'-dihydroxybiphenyl (HAB) that can further improve the thermal and chemical properties of a polyimide.

In the present invention, as a comonomer, there can be used an aromatic diamine represented by Formula 4:

$H_2N-Ar_2-NH_2$  <Formula 4>

(wherein $Ar_2$ is as defined in Formula 1).

The aromatic diamine is allowed to react with the acid dianhydride of Formula 2 and the ortho-hydroxydiamine of Formula 3 to synthesize a hydroxyl polyimide-co-polyimide.

Any aromatic diamine defined in Formula 4 may be used without limitation. 4,4'-Oxydianiline (ODA) or 2,4,6-trimethylphenylenediamine (DAM) is more preferably used as the aromatic diamine.

Specifically, in step i), the acid dianhydride of Formula 2, the ortho-hydroxydiamine of Formula 3, and the aromatic diamine of Formula 4 are dissolved and stirred in an organic solvent, such as N-methylpyrrolidone (NMP), to obtain a polyamic acid solution, followed by azeotropic thermal imidization to afford a hydroxyl polyimide-co-polyimide represented by General Formula 1:

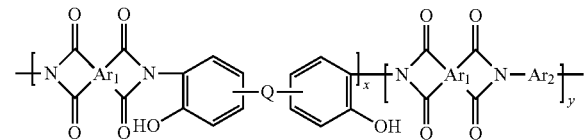

<General Formula 1>

(wherein $Ar_1$, $Ar_2$, Q, x, and y are as defined in Formula 1).

The azeotropic thermal imidization is carried out in such a manner that toluene or xylene is added to the polyamic acid solution and the polyamic acid is subjected to an imidization reaction with stirring at 180 to 200° C. for 6 to 8 hours. During the azeotropic thermal imidization, imide rings are created to release water, which is removed as an azeotropic mixture with the toluene or xylene.

Next, the hydroxyl polyimide-co-polyimide is dissolved in an organic solvent, such as N-methylpyrrolidone (NMP), and the polymer solution is electrospun to obtain a hydroxyl polyimide-co-polyimide membrane.

After step ii), a coating layer of hydroxyl polyimide-co-polyimide nanoparticles may also be formed on the hydroxyl polyimide-co-polyimide membrane. In this case, the copolymer separation membrane takes the form of a composite membrane. The hydroxyl polyimide-co-polyimide nanoparticles are formed by dissolving a hydroxyl polyimide-co-polyimide and polyvinylpyrrolidone (PVP) or polyvinyl alcohol (PVA) as a dispersant in a solvent to obtain a polymer solution, dropping a non-solvent into the polymer solution, stirring the mixture, and depositing precipitates.

Generally, polymer particles may be formed by a reprecipitation method. In this case, a non-solvent is dropped into a polymer solution or vice versa. The dropping of a polymer solution into a non-solvent leads to the formation of the polymer particles that are non-uniform in shape and are as small as a few tens of nanometers. Since the polymer particles have a smaller pore size than the electrospun support of the composite membrane in the form of a nonwoven fabric, there is a possibility that the polymer particles may penetrate into the thermally rearranged composite membrane. In order to exclude this possibility, a non-solvent is dropped into the polymer solution in the present invention. The polymer solution is obtained by dissolving the polymer particles and polyvinylpyrrolidone (PVP) or polyvinyl alcohol (PVA) as a dispersant in a suitable solvent.

The solvent may be selected from the group consisting of N-methylpyrrolidone (NMP), dimethylacetamide (DMAc), dimethylformamide (DMF), and dimethyl sulfoxide (DMSO) and the non-solvent may be selected from the group consisting of water, methanol, ethanol, isopropyl alcohol, and acetone.

Preferably, the polymer solution contains 2 to 5% by weight of the hydroxyl polyimide-co-polyimide. If the concentration of the hydroxyl polyimide-co-polyimide is lower than 2% by weight, the particle size is excessively small and it is thus difficult to apply the polymer solution to the fabrication of the composite membrane. Meanwhile, if the concentration of the hydroxyl polyimide-co-polyimide exceeds 5% by weight, the particles have a relatively large size and are in the form of bundles of non-uniform spheres.

The concentration of the dispersant polyvinylpyrrolidone (PVP) or polyvinyl alcohol (PVA) in the polymer solution is adjusted to 2 to 5% by weight. It is desirable to dissolve the same amount of the dispersant as the hydroxyl polyimide-co-polyimide in the solvent because the particles can be prevented from aggregating in the polymer solution.

The dropping rate of the non-solvent into the polymer solution is from 0.05 to 1 mL/min. Within this range, the size and shape of the particles can be controlled. After completion of the dropping, the mixture is stirred. If the stirring rate is excessively low, the particles tend to aggregate. Meanwhile, if the stirring rate is excessively high, bubbles may be formed in the polymer solution and may be found as impurities in the final product. It is thus preferred to adjust the stirring rate to the range of 300 to 1,000 rpm. Within this range, the particles can be formed in the form of uniform spheres.

If the hydroxyl polyimide-co-polyimide nanoparticles are formed at a temperature lower than room temperature, the particle size may be excessively small. Meanwhile, if the hydroxyl polyimide-co-polyimide nanoparticles are formed at a temperature exceeding 100° C., black sooty bubbles may float on the surface of the solution and the particles are non-uniform and aggregate. It is thus preferred to form the nanoparticles at a temperature of 20 to 100° C.

Various known coating techniques may be used to form a coating layer on the hydroxyl polyimide-co-polyimide membrane. Spray coating is more preferred in terms of uniformity and ease of coating.

Finally, the hydroxyl polyimide-co-polyimide membrane is thermally rearranged to fabricate the thermally rearranged poly(benzoxazole-co-imide) separation membrane as a final product. Particularly, in the case of the composite separation membrane including the coating layer of the hydroxyl polyimide-co-polyimide nanoparticles, the thermal rearrangement makes the coating layer uniform and allows the composite separation membrane to have a structure in which the hydroxyl polyimide-co-polyimide membrane is perfectly bound to the coating layer.

The thermal rearrangement is performed by heating the hydroxyl polyimide-co-polyimide membrane to 350 to 450° C. at a rate of 3° C./min in a high-purity argon atmosphere and maintaining the temperature for 1 to 2 hours.

Mode for Carrying out the Invention

The present invention will be explained in detail with reference to the following examples and the accompanying drawings.

SYNTHESIS EXAMPLE 1

Synthesis of Hydroxyl Polyimide-co-polyimide 2.0 mmol of 2,2-bis(3-amino-4-hydroxyphenyl)hexafluoropropane (APAF) and 8.0 mmol of 4,4'-oxydianiline (ODA) were dissolved in 10 ml of anhydrous NMP. The solution was cooled down to 0° C. and a solution of 10 mmol of 4,4'-hexafluoroisopropylidene phthalic dianhydride (6FDA) in 10 ml of anhydrous NMP was added thereto. After stirring at 0° C. for 15 min, the mixture was allowed to stand at room temperature overnight, affording a viscous polyamic acid solution. Subsequently, 20 ml of ortho-xylene was added to the polyamic acid solution. The mixture was subjected to imidization with vigorous stirring at 180° C. for 6 h. During the imidization, imide rings were created to release water, which was removed as an azeotropic mixture with the xylene. The resulting blown solution was allowed to cool to room temperature, precipitated in distilled water, washed with hot water, and dried in a convection oven at 120° C. for 12 h, affording the hydroxyl polyimide-co-polyimide (also referred to as "6FDA-APAF$_2$-ODA$_8$") represented by Formula 5:

<Formula 5>

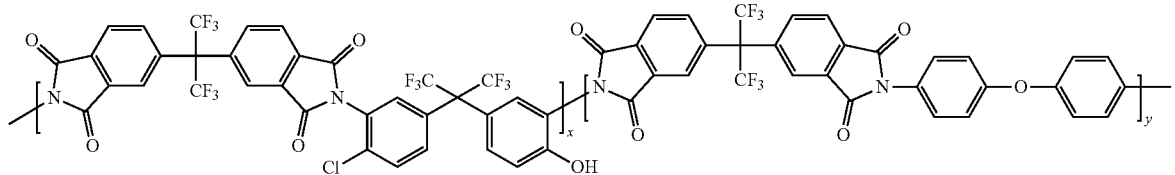

wherein x and y representing the mole fractions of the corresponding repeating units are 0.2 and 0.8, respectively.

The synthesis of the hydroxyl polyimide-co-polyimide of Formula 5 was confirmed by $^1$H-NMR and FT-IR data.

$^1$H-NMR (300 MHz, DMSO-$d_6$, ppm): 10.41 (s, —OH), 8.10 (d, $H_{ar}$, J=8.0 Hz), 7.92 (d, $H_{ar}$, J=8.0 Hz), 7.85 (s, $H_{ar}$), 7.80 (s, $H_{ar}$), 7.71 (s, $H_{ar}$), 7.47 (s, $H_{ar}$), 7.20 (d, $H_{ar}$, rearrangement, yielding the thermally rearranged poly(benzoxazole-co-imide) separation membrane, the copolymer being represented by Formula represented by Formula 6:

<Formula 6>

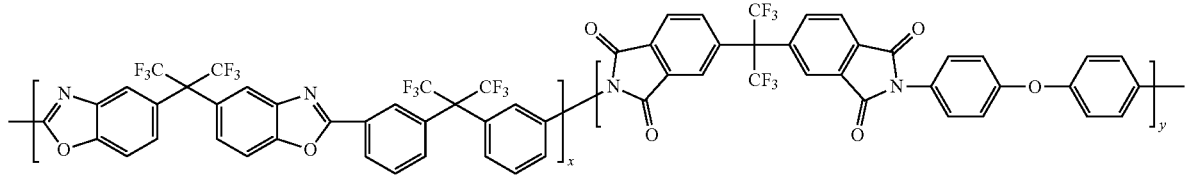

J=8.3 Hz), 7.04 (d, $H_{ar}$, J=8.3 Hz). FT-IR (film): ν (O—H) at 3400 cm$^{-1}$, ν (C=O) at 1786 and 1705 cm$^{-1}$, Ar (C—C) at 1619, 1519 cm$^{-1}$, imide ν (C—N) at 1377 cm$^{-1}$, (C—F) at 1299-1135 cm$^{-1}$, imide (C—N—C) at 1102 and 720 cm$^{-1}$.

SYNTHESIS EXAMPLES 2-9

Synthesis of Hydroxyl Polyimide-polyamide Copolymers

Hydroxyl polyimide-polyimide copolymers were prepared in the same manner as in Synthesis Example 1, except that the acid dianhydride, the ortho-hydroxydiamine, and the aromatic diamine were changed as shown in Table 1. The synthesized samples were named in the same manner as the hydroxyl polyimide-co-polyimide synthesized in Synthesis Example 1.

TABLE 1

| Synthesis Example No. | Sample name | Mole fractions |
| --- | --- | --- |
| 2 | 6FDA-APAF$_5$-ODA$_5$ | x = 0.5, y = 0.5 |
| 3 | 6FDA-APAF$_8$-ODA$_2$ | x = 0.8, y = 0.2 |
| 4 | 6FDA-APAF$_5$-DAM$_5$ | x = 0.5, y = 0.5 |
| 5 | 6FDA-HAB$_5$-ODA$_5$ | x = 0.5, y = 0.5 |
| 6 | 6FDA-HAB$_8$-ODA$_2$ | x = 0.8, y = 0.2 |
| 7 | 6FDA-HAB$_5$-DAM$_5$ | x = 0.5, y = 0.5 |
| 8 | ODPA-HAB$_5$-ODA$_5$ | x = 0.5, y = 0.5 |
| 9 | ODPA-HAB$_8$-ODA$_2$ | x = 0.8, y = 0.2 |

HAB (3,3'-diamino-4,4'-dihydroxybiphenyl)
DAM (2,4,6-trimethylphenylenediamine)

EXAMPLE 1

Fabrication of Thermally Rearranged Poly(Benzoxazole-co-imide) Separation Membrane 10 wt % of 6FDA-APAF$_2$-ODA$_8$ synthesized in Synthesis Example 1 was dissolved in dimethylacetamide (DMAc), 6 ml of the polymer solution was filled in a 10 ml syringe fitted with a 23G needle. The filled syringe was mounted in a syringe pump of an electrospinning system (ES-robot, NanoNC, Korea). The polymer solution was electrospun under general electrospinning conditions to form an electrospun membrane. The electrospun membrane was placed between an alumina plate and a carbon cloth, heated to 400° C. at a rate of 3° C./min under a high-purity argon atmosphere, and maintained at 400° C. for 2 h for thermal (wherein x and y are as defined in Formula 5).

EXAMPLES 2-9

Fabrication of Thermally Rearranged Poly(Benzoxazole-co-imide) Separation Membranes Thermally rearranged poly(benzoxazole-co-imide) separation membranes were fabricated in the same manner as in Example, 1, except that the samples obtained in Synthesis Examples 2-9 were used.

PRODUCTION EXAMPLE 1

Production of Hydroxyl Polyimide-co-polyimide Nanoparticles

The hydroxyl polyimide-co-polyimide (sample name "ODPA-HAB$_5$-ODA$_5$") prepared in Synthesis Example 8 and polyvinylpyrrolidone (PVP) as a dispersant were injected into a 4-neck flask equipped with a stirrer, and NMP as a solvent was added thereto to obtain a polymer solution containing 2 wt % of the copolymer and 2 wt % of the dispersant. The polymer solution was maintained in an oil bath at 70° C. with stirring at 300 rpm. Subsequently, water as a non-solvent was dropped at a rate of 0.05 mL/min into the polymer solution to precipitate ODPA-HAB$_5$-ODA$_5$ particles. Then, the 4-neck flask was quenched in ice-water to prevent aggregation of the particles. Thereafter, the mixture was filtered through a paper filter, centrifuged to remove residual solvent and the non-solvent, and freeze-dried at 0° C. for 30 h, giving ODPA-HAB$_5$-ODA$_5$ nanoparticles.

PRODUCTION EXAMPLE 2

Production of Hydroxyl Polyimide-co-polyamide Nanoparticles

ODPA-HAB$_5$-ODA$_5$ nanoparticles were produced in the same manner as in Production Example 1, except that polyvinyl alcohol (PVA) was used as a dispersant.

EXAMPLE 10

Fabrication of Thermally Rearranged Poly(Benzoxazole-co-imide) Separation Membrane Including Coating Layer An electrospun membrane was produced from the sample ODPA-HAB$_5$-ODA$_5$ obtained in Synthesis Example 8 in the same manner as in Example 1. 1 wt % of the ODPA-HAB$_5$-ODA$_5$ nanoparticles (average particle diameter=0.5-2 μm) obtained by reprecipitation in Production Example 1 were dispersed in ethanol and the dispersion was sprayed on the electrospun membrane to form a coating layer. Thermal rearrangement was performed in the same manner as in Example 1 to fabricate a thermally rearranged poly(benzoxazole-co-imide) separation membrane in the form of a composite membrane.

EXAMPLE 11

Fabrication of Thermally Rearranged Poly(Benzoxazole-co-imide) Separation Membrane Including Coating Layer A thermally rearranged poly(benzoxazole-co-imide) separation membrane in the form of a composite membrane was fabricated in the same manner as in Example 10, except that a coating layer was formed using an ethanolic dispersion of 1 wt % of the ODPA-HAB$_5$-ODA$_5$ nanoparticles (average particle size=0.5-2 µm) obtained by reprecipitation in Production Example 2.

EXPERIMENTAL EXAMPLE 1

Permeate Flux Measurement

Figure 14:
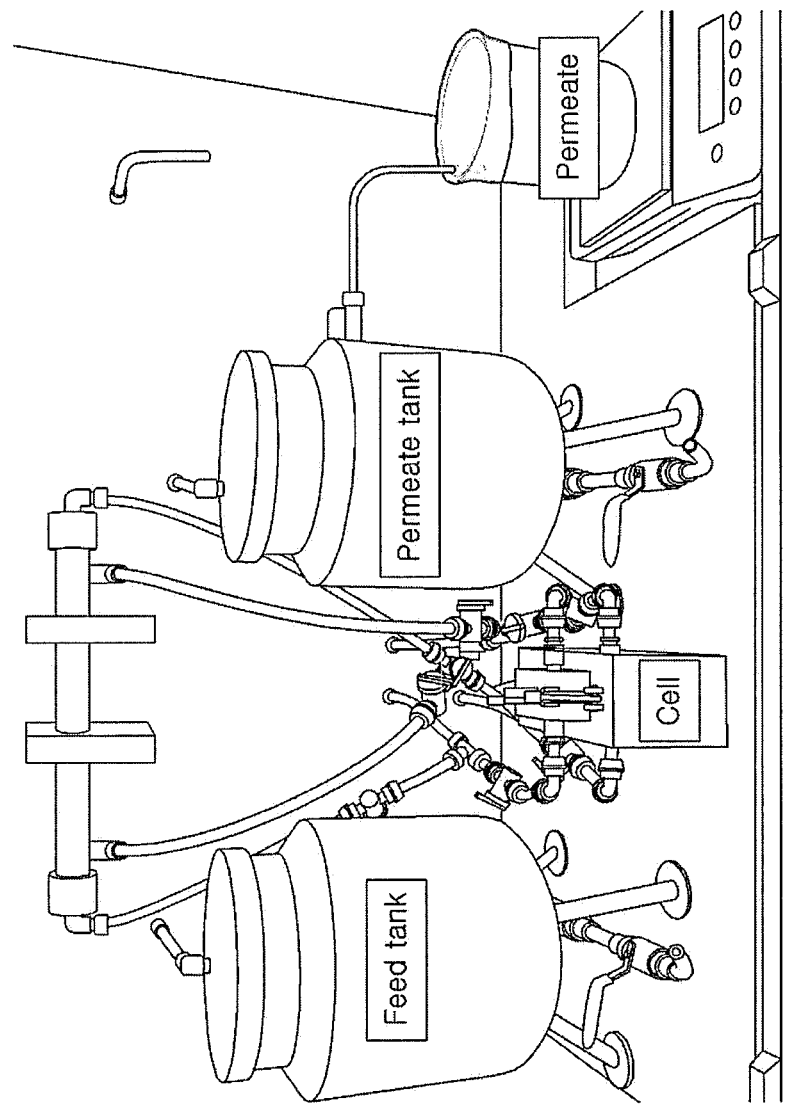
FIG. 14 shows a system for implementing a DCMD process employed in the present invention.

The permeate fluxes of each membrane in various membrane distillation processes were measured. For example, a direct contact membrane distillation (DCMD) process was performed using a system shown in FIG. 14. For the DCMD process, the temperature of distilled water as a feed liquid was variable (50, 60, and 70° C.) and the temperature of a permeate was fixed to 20° C. The effective area of the membrane was 0.0056716 m$^2$.

ATR-IR spectra of the thermally rearranged poly(benzoxazole-co-imide) separation membranes fabricated in Examples 1-9 are shown in FIG. 1. Peaks corresponding to O—H stretching around 3400 cm$^{-1}$ disappeared and two typical distinct peaks corresponding to benzoxazole rings were found around 1480 cm$^{-1}$ and 1054 cm$^{-1}$, revealing the formation of benzoxazole rings during the thermal treatment. Absorption bands peculiar to the imide groups were observed around 1784 cm$^{-1}$ and 1717 cm$^{-1}$, demonstrating good thermal stability of the aromatic imide linking rings even at a thermal rearrangement temperature of 400° C.

FIG. 2 shows an ATR-IR spectrum of the thermally rearranged poly(benzoxazole-co-imide) separation membrane in the form of a composite membrane including the coating layer, which was fabricated in Example 10. An ATR-IR spectrum of the membrane fabricated in Example 8 as a representative example of the monolayer separation membranes is also shown in FIG. 2. The two separation membranes exhibited almost the same characteristic peaks, demonstrating that the thermally rearranged poly(benzoxazole-co-imide) separation membrane including the coating layer was stably fabricated.

FIGS. 3A through 3D show scanning electron microscopy (SEM) and transmission electron microscopy (TEM) images of the hydroxyl polyimide-co-polyimide nanoparticles produced in Production Examples 1 and 2. Specifically, FIG. 3A and FIG. 3B are SEM and TEM images of the copolymer nanoparticles produced in Production Example 1, respectively, and FIG. 3C and FIG. 3D are SEM and TEM images of the copolymer nanoparticles produced in Production Example 2, respectively. These images reveal that the nanoparticles produced in Production Example 1 were spherical, dense, and free of pores and the nanoparticles produced in Production Example 2 were spherical but were in the form of sea squirts containing many pores.

Table 2 shows basic properties of the thermally rearranged copolymer membranes fabricated in Examples 1-10 for their application to membrane distillation processes.

TABLE 2

| Example No. | Membrane thickness (µm) | Pore size (µm) | Liquid entry pressure (bar) | Contact angle (°) | Tensile strength (Mpa) | Elongation (%) | Thermal conductivity (W/K · m) |
|---|---|---|---|---|---|---|---|
| 1 | 85 | 1.6 | 0.5 | 130 | 8.7 | 6.6 | 2.1 |
| 2 | 50 | 0.8 | 1.0 | 130 | 6.3 | 7.0 | 2.4 |
| 3 | 46 | 0.5 | 0.9 | 125 | 20.2 | 7.2 | 2.3 |
| 4 | 51 | 0.7 | 0.8 | 127 | 10.0 | 9.8 | 2.2 |
| 5 | 70 | 0.8 | 0.6 | 127 | 15.6 | 12.5 | 2.6 |
| 6 | 45 | 0.2 | 1.5 | 128 | 23.3 | 7.0 | 2.5 |
| 7 | 50 | 0.8 | 0.5 | 129 | 17.7 | 12.5 | 2.4 |
| 8 | 20 | 0.3 | 1.0 | 132 | 52.7 | 10.9 | 2.9 |
| 9 | 40 | 0.5 | 0.8 | 135 | 23.3 | 11.7 | 2.8 |
| 10 | 36 | 0.3 | 1.0 | 136 | 53.4 | 12.6 | 2.7 |

As can be seen from the results in Table 2, not only the monolayer membranes without a coating layer (Examples 1-9) but also the membrane with the coating layer (Example 10) had good mechanical properties and low electrical conductivities at levels suitable for membrane distillation processes. Particularly, the composite membrane with the coating layer (Example 10) was measured to have a higher tensile strength than a commercial polyurethane membrane for membrane distillation (45 MPa) and a relatively high liquid entry pressure.

Weight loss caused by decarboxylation in the course of producing the thermally rearranged polybenzoxazole in Example 1 was measured using a thermogravimetric analyzer (TGA) and is shown in FIG. 4. A distinct peak corresponding to the weight loss was observed at 300-470° C. lower than the decomposition temperature (500-600° C.) of general polymer chains. $CO_2$ release at the initial stage of the weight loss was demonstrated using a mass analyzer, indicating that thermal rearrangement was involved.

Figure 5B:
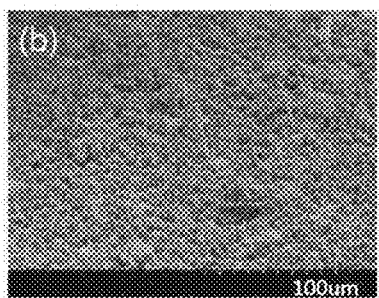
FIG. 5B shows a scanning electron microscopy (SEM) image of a thermally rearranged poly(benzoxazole-co-imide) separation membranes fabricated in Example 10, of which includes a coating layer.
Figure 5C:
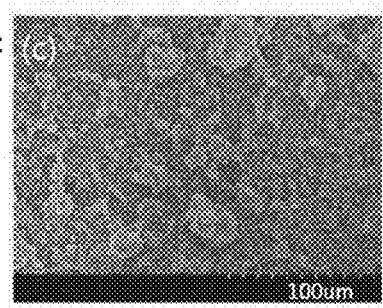
FIG. 5C shows a scanning electron microscopy (SEM) image of a thermally rearranged poly(benzoxazole-co-imide) separation membrane fabricated in Example 11, of which includes a coating layer.
Figure 5D:
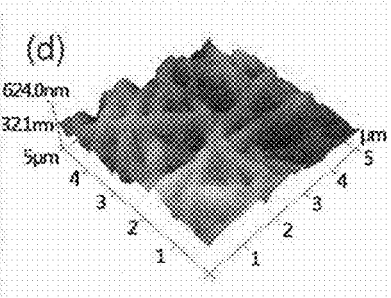
FIG. 5D shows an atomic field microscopy (AFM) image of a thermally rearranged poly(benzoxazole-co-imide) separation membrane fabricated in Example 8, of which includes a coating layer.
Figure 5E:
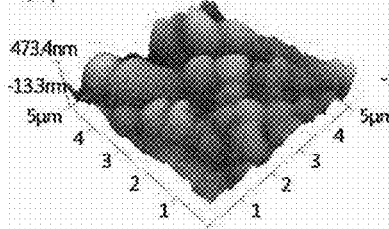
FIG. 5E shows an atomic field microscopy (AFM) image of a thermally rearranged poly(benzoxazole-co-imide) separation membrane fabricated in Example 10, of which includes a coating layer.
Figure 5F:
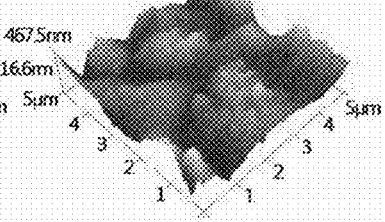
FIG. 5F shows an atomic field microscopy (AFM) image of a thermally rearranged poly(benzoxazole-co-imide) separation membrane fabricated in Example 11, of which includes a coating layer.

FIGS. 5A through 5F show scanning electron microscopy (SEM) and atomic field microscopy (AFM) images of the thermally rearranged poly(benzoxazole-co-imide) separation membrane fabricated in Example 8 and the thermally rearranged poly(benzoxazole-co-imide) separation membranes with the corresponding coating layers fabricated in Examples 10 and 11. Specifically, in FIGS. 5A and 5D are SEM and AFM images of the copolymer separation membrane fabricated in Example 8, respectively, FIG. 5B and FIG. 5E are SEM and AFM images of the copolymer separation membrane fabricated in Example 10, respectively, and FIG. 5C and FIG. 5F are SEM and AFM images of the copolymer separation membrane fabricated in Example 11, respectively. FIGS. 5B, 5C, 5E and 5F reveal that the nanoparticle coating layers were uniformly formed, and at the same time, the electrospun hydroxyl polyimide-co-polyimide membranes were perfectly bound to the corresponding coating layers to fabricate the thermally rearranged poly(benzoxazole-co-imide) separation membranes in the form of composite membranes by the final thermal rearrangement. When compared with FIG. 5A and FIG. 5D, the thermally rearranged poly(benzoxazole-co-imide) separation membranes in the form of composite membranes whose surfaces were covered with the particles had small pore sizes and were roughened, compared to the thermally rearranged poly(benzoxazole-co-imide) separation membranes without a coating layer in the form of monolayer membranes.

Figure 6A:
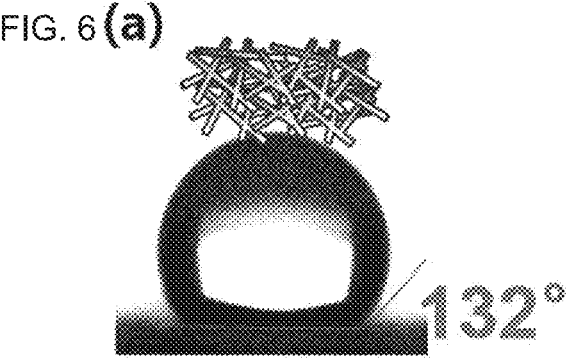
FIG. 6A shows the contact angles of a thermally rearranged poly(benzoxazole-co-imide) separation membrane, including a coating layer, fabricated in Example 8.
Figure 6B:
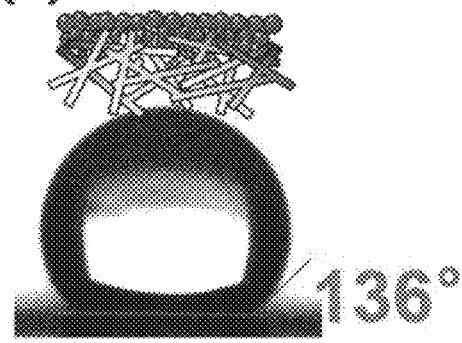
FIG. 6B shows the contact angles of a thermally rearranged poly(benzoxazole-co-imide) separation membrane, including a coating layer, fabricated in Example 10.
Figure 6C:
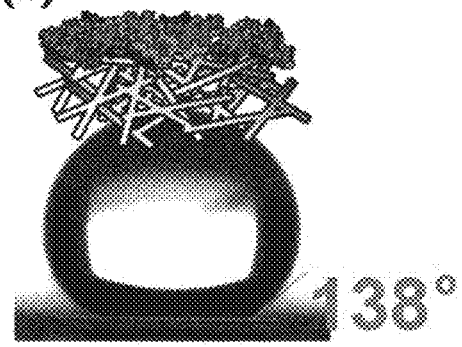
FIG. 6C shows the contact angles of a thermally rearranged poly(benzoxazole-co-imide) separation membrane, including a coating layer, fabricated in Example 11.

As shown in FIGS. 6A through 6C, the composite membranes had larger contact angles than the monolayer membrane, indicating their higher hydrophobicity. FIG. 7 shows the pore sizes and pore size distributions of the monolayer membrane and the composite membranes. Basic physical properties of the membranes are shown in Table 3.

TABLE 3

| Sample | Average pore size (μm) | Pore size distribution standard deviation (%) | Porosity (%) | Liquid entry pressure (bar) |
|---|---|---|---|---|
| Example 8 | 0.38 | 0.214 | 81 | 0.5 |
| Example 10 | 0.27 | 0.158 | 78 | 1.0 |
| Example 11 | 0.32 | 0.177 | 83 | 1.0 |
| GVHP* | 0.19 | 0.116 | 75 | 2.4 |

GVHP*: Commercial PVDF membrane from Millipore

The data in FIG. 7 and Table 3 reveal that the surface pore sizes of the composite membranes were smaller than that of the monolayer membrane, which doubled the liquid entry pressures of the composite membranes.

The permeate fluxes of the thermally rearranged poly(benzoxazole-co-imide) separation membranes (sample name PBO) with different thicknesses in the form of monolayer membranes fabricated in Example 8 were measured at various flow rates to determine whether the separation membranes were suitable for membrane distillation.

Here, the numbers after PBO indicate the thicknesses (μm) of the separation membranes. As shown in FIG. 8, as the thickness of the separation membrane decreased, the mass transfer resistance to water vapor decreased, indicating high performance of the separation membrane. The relatively thick (100 μm) membrane also showed higher performance than the commercial GVHP membrane (125 μm thick). In conclusion, the thermally rearranged poly(benzoxazole-co-imide) separation membranes in the form of monolayer membranes were found to be very suitable for membrane distillation.

The permeate fluxes of the 60 μm thick thermally rearranged poly(benzoxazole-co-imide) separation membrane in the form of a monolayer membrane fabricated in Example 8, the 60 μm thick thermally rearranged poly(benzoxazole-co-imide) separation membranes in the form of composite membranes fabricated in Examples 10 and 11, and the 125 μm thick commercial membrane (GVHP) were measured at various temperatures to investigate their direct contact membrane distillation (DCMD) performance. The results are shown in FIG. 9. As shown in FIG. 9, the DCMD performance of all membranes increased with increasing temperature of raw water, which is explained by an increased driving force. The thermally rearranged poly(benzoxazole-co-imide) separation membrane in the form of a monolayer membrane fabricated in Example 8 showed the highest performance. The porous composite membrane of Example 11 showed higher performance than the dense composite membrane of Example 10 although both membranes were covered with the thermally rearranged copolymer particles. The higher performance of the composite membrane of Example 11 is interpreted to be because the porous thermally rearranged copolymer particles do not impede the migration of vapor.

Figure 10A:
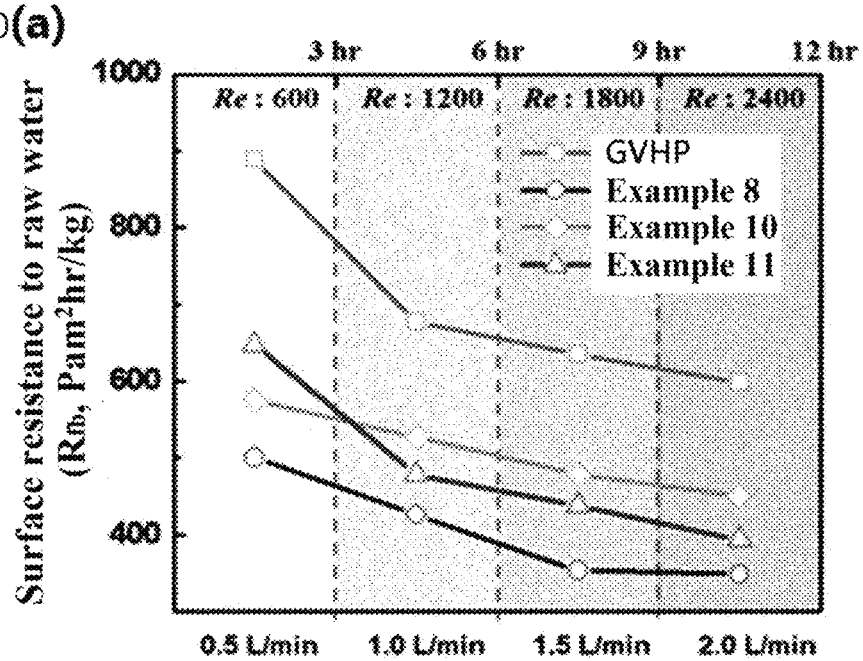
FIG. 10A shows the surface resistant to raw water of a 60 μm thick thermally rearranged poly(benzoxazole-co-imide) separation membrane in the form of a monolayer membrane fabricated in Example 8, 60 μm thick thermally rearranged poly(benzoxazole-co-imide) separation membranes in the form of composite membranes fabricated in Examples 10 and 11, and a 125 μm thick commercial membrane (GVHP), which were measured at various flow rates by calculating surface resistance to raw water.
Figure 10B:
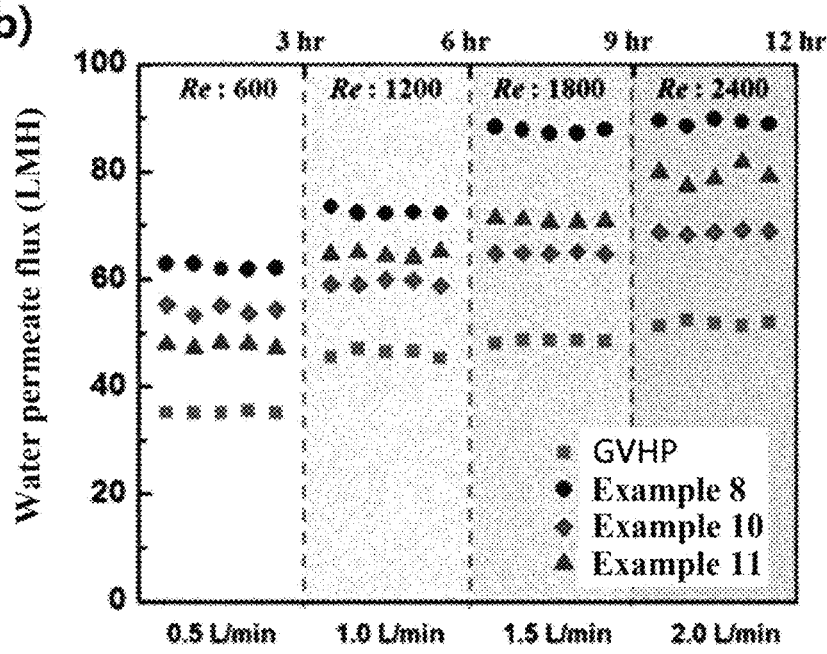
FIG. 10B shows the water permeate fluxes of a 60 μm thick thermally rearranged poly(benzoxazole-co-imide) separation membrane in the form of a monolayer membrane fabricated in Example 8, 60 μm thick thermally rearranged poly(benzoxazole-co-imide) separation membranes in the form of composite membranes fabricated in Examples 10 and 11, and a 125 μm thick commercial membrane (GVHP), which were measured at various flow rates.

The permeate fluxes of the 60 μm thick thermally rearranged poly(benzoxazole-co-imide) separation membrane in the form of a monolayer membrane fabricated in Example 8, the 60 μm thick thermally rearranged poly(benzoxazole-co-imide) separation membranes in the form of composite membranes fabricated in Examples 10 and 11, and the 125 μm thick commercial membrane (GVHP) were measured at various flow rates to investigate their direct contact membrane distillation (DCMD) performance. The results are shown in FIGS. 10A and 10B. The decreased temperature polarization with increasing flow rate was quantified by calculating the surface resistance of raw water and is shown in FIG. 10A. As shown in FIGS. 10A and 10B, the thermally rearranged poly(benzoxazole-co-imide) separation membrane in the form of a monolayer membrane fabricated in Example 8, which had the highest porosity and the largest pore size, showed very low surface resistance, implying its high performance. Further, the composite membrane with the porous coating layer fabricated in Example 11 showed low surface resistance compared to the composite membrane with the relatively dense coating layer fabricated in Example 10, implying its high DCMD performance.

On the other hand, when a membrane with good DCMD performance has a low salt rejection rate, it loses its significance in the process. The DCMD performance of each of the separation membranes fabricated in Examples 8, 10, 11 was continuously measured using saline water (0.5 M NaCl (aq.)) for 4 h. The results are shown in FIG. 11. As shown in FIG. 11, the porous thermally rearranged poly(benzoxazole-co-imide) separation membrane in the form of a monolayer membrane fabricated in Example 8 and the composite membrane with the porous coating layer fabricated in Example 11 showed higher salt rejection rates, implying their better performance.

FIG. 12 shows the long-term stabilities of the porous thermally rearranged poly(benzoxazole-co-imide) separation membrane in the form of a monolayer membrane fabricated in Example 8 and the composite membrane with the porous coating layer fabricated in Example 11. As shown in FIG. 12, both membranes showed stable performance in a 0.5 M aqueous NaCl solution having the same concentration as seawater for about 66 h. The porous thermally rearranged poly(benzoxazole-co-imide) separation membrane in the form of a monolayer membrane fabricated in Example 8 had higher performance due to its larger pore size but showed slightly lower salt rejection rates. The composite membrane with the porous coating layer fabricated in Example 11 had somewhat lower performance but showed higher salt rejection rates.

The performance stabilities and water permeabilities of the porous thermally rearranged poly(benzoxazole-co-imide) separation membrane in the form of a monolayer membrane fabricated in Example 8, which was evaluated to have the highest performance, were measured using aqueous NaCl solutions with higher concentrations (1, 3, and 5 M). The results are shown in FIG. 13. As shown in FIG. 13, the separation membrane of Example 8 showed salt rejection rates of 99.99% at different temperatures, each for 10 h, demonstrating its very stable performance. As the vapor pressure of water decreased with increasing salt concentration, the performance of the separation membrane tended to decrease. However, the separation membrane was evaluated to be applicable without any problem to membrane distillation even in saline water having a high concentration.

INDUSTRIAL APPLICABILITY

As is apparent from the foregoing, the thermally rearranged poly(benzoxazole-co-imide) separation membrane of the present invention has high liquid entry pressure, low thermal conductivity, high permeate flux, and good long-term stability, as well as excellent thermal and chemical properties due to its unique chemical structure. Therefore, the copolymer separation membrane of the present invention can be applied to membrane distillation processes.

The invention claimed is:

1. A thermally rearranged poly(benzoxazole-co-imide) separation membrane for membrane distillation, the copolymer being represented by Formula 1:

<Formula 1>

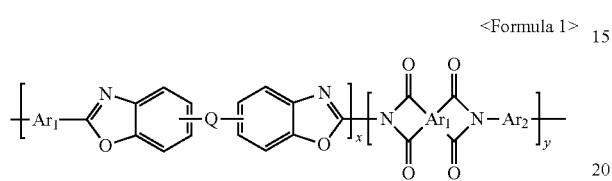

(wherein each $Ar_1$ is an aromatic cyclic group selected from substituted or unsubstituted tetravalent $C_6$-$C_{24}$ arylene groups and substituted or unsubstituted tetravalent $C_4$-$C_{24}$ heterocyclic groups, the aromatic cyclic group being a monocyclic or fused aromatic ring, or is a combination of two or more aromatic cyclic groups linked through a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH, $Ar_2$ is an aromatic cyclic group selected from substituted or unsubstituted divalent $C_6$-$C_{24}$ arylene groups and substituted or unsubstituted divalent $C_4$-$C_{24}$ heterocyclic groups, the aromatic cyclic group being a monocyclic or fused aromatic ring, or is a combination of two or more aromatic cyclic groups linked through a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH, Q represents a single bond or is O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$, CO—NH, $C(CH_3)(CF_3)$ or a substituted or unsubstituted phenylene group, and x and y represent the mole fractions of the corresponding repeating units and satisfy 0.1≤x≤0.9, 0.1≤y≤0.9, and x+y=1)), and wherein the thermally rearranged poly(benzoxazole-co-imide) separation membrane is a composite membrane comprising a coating layer of hydroxyl polyimide-co-polyimide nanoparticles formed on the electrospun membrane of hydroxyl polyimide-co-polyimide represented by General Formula 1:

<General Formula 1>

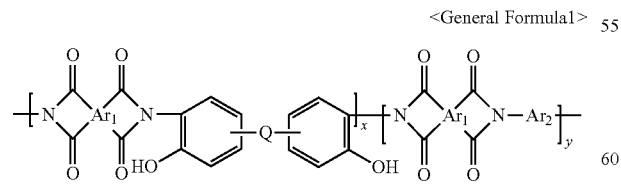

wherein $Ar_1$, $Ar_2$, Q, x, and y are as defined in Formula 1).

2. The thermally rearranged poly(benzoxazole-co-imide) separation membrane according to claim 1, wherein, in Formula 1, each $Ar_1$ is selected from the group consisting of the following structures:

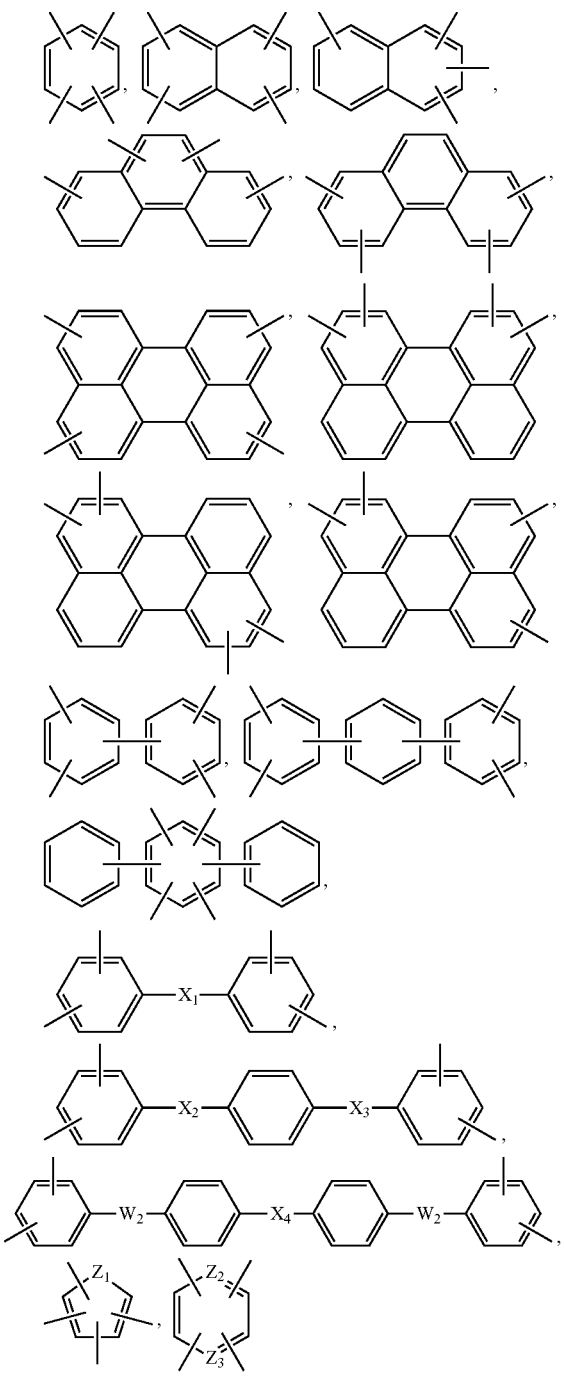

wherein $X_1$, $X_2$, $X_3$, and $X_4$ are identical to or different from each other and are each independently O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH, $W_1$ and $W_2$ are identical to or different from each other and are each independently O, S, or CO, $Z_1$ is O, S, $CR_1R_2$ or $NR_3$ (where $R_1$, $R_2$, and $R_3$ are identical to or different from each other and are each independently hydrogen or $C_1$-$C_5$ alkyl), $Z_2$ and $Z_3$ are identical to or different from each other and are each independently N or $CR_4$ (where $R_4$ is hydrogen or $C_1$-$C_5$ alkyl), with the proviso that $Z_2$ and $Z_3$ are not simultaneously $CR_4$.

3. The thermally rearranged poly(benzoxazole-co-imide) separation membrane according to claim 2, wherein, in Formula 1, each $Ar_1$ is selected from the group consisting of the following structures:
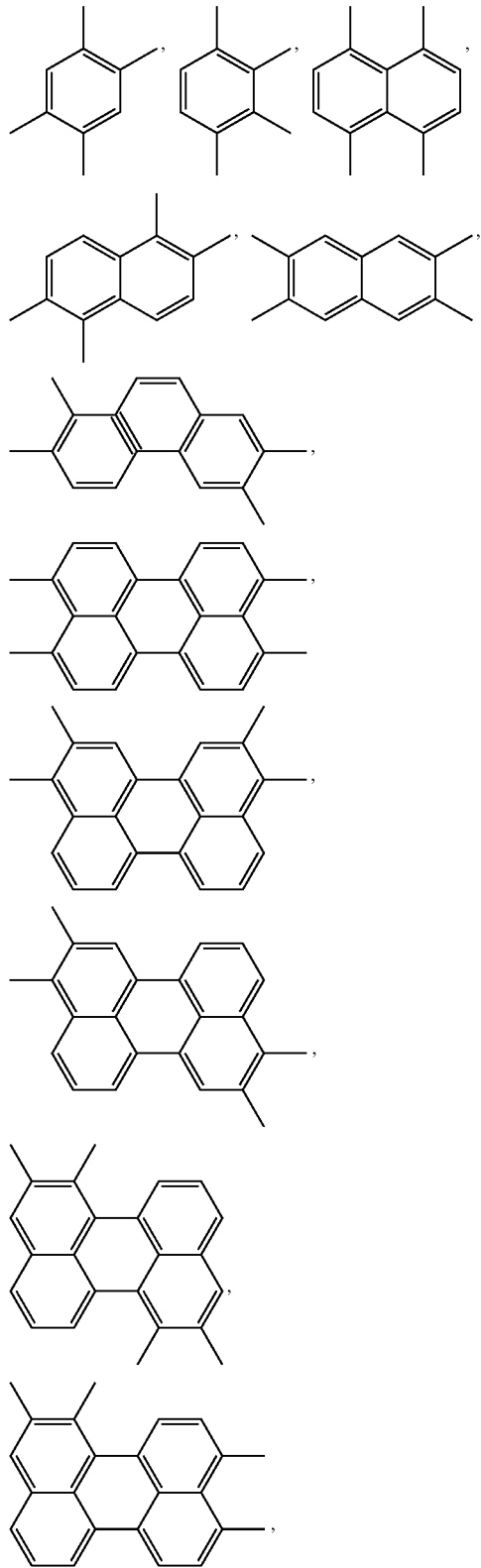
-continued
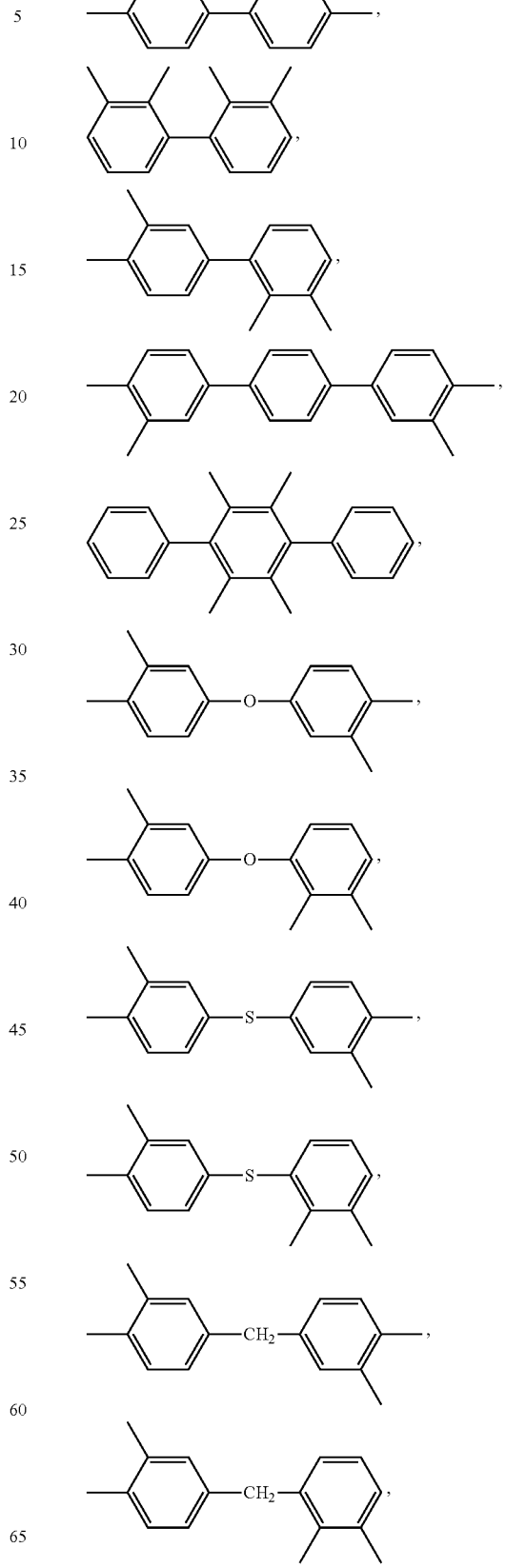

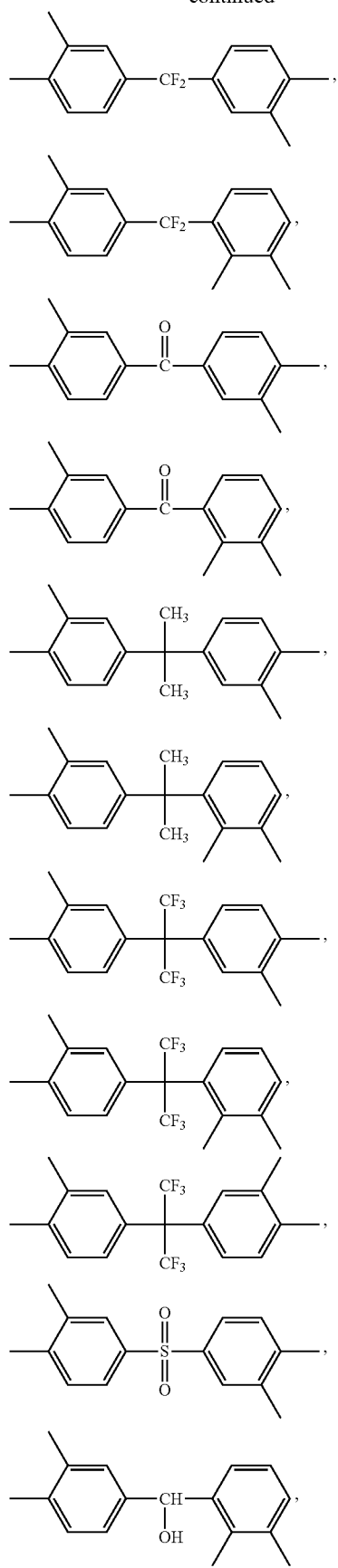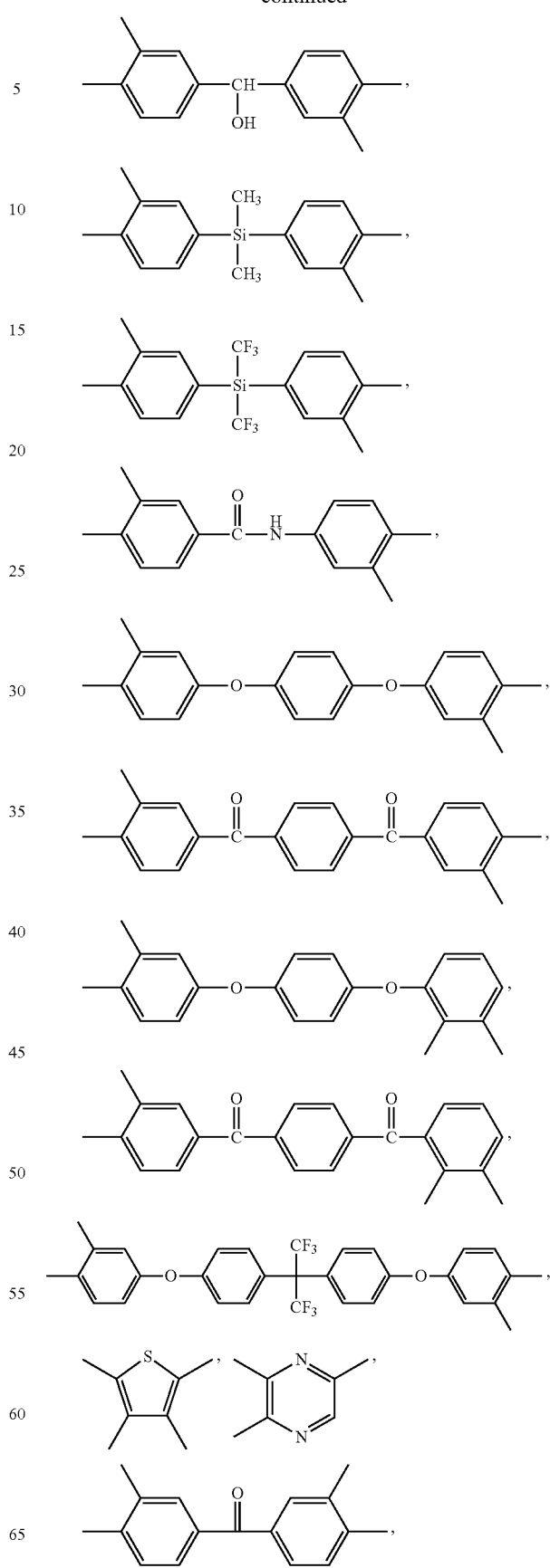

-continued

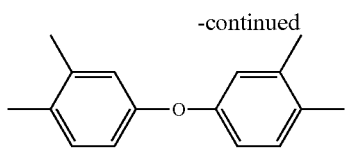

4. The thermally rearranged poly(benzoxazole-co-imide) separation membrane according to claim 1, wherein, in Formula 1, $Ar_2$ is selected from the group consisting of the following structures:

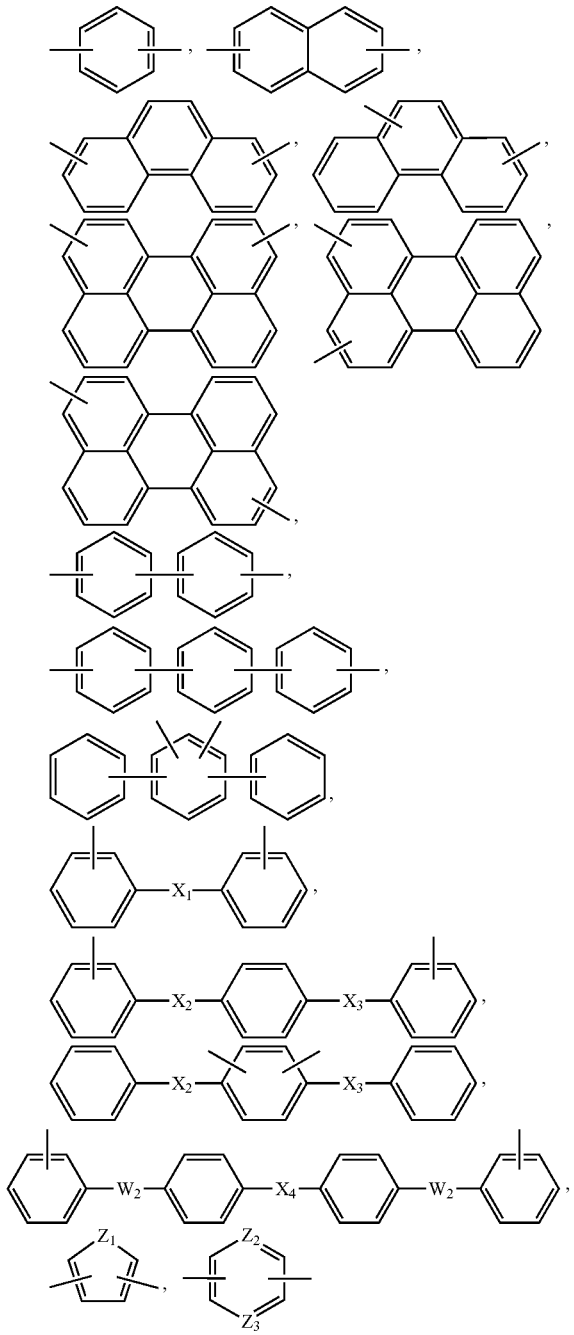

wherein $X_1$, $X_2$, $X_3$, and $X_4$ are identical to or different from each other and are each independently O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, $W_1$ and $W_2$ are identical to or different from each other and are each independently O, S or CO, and $Z_1$ is O, S, $CR_1R_2$ or $NR_3$ (where $R_1$, $R_2$, and $R_3$ are identical to or different from each other and are each independently hydrogen or $C_1$-$C_5$ alkyl), $Z_2$ and $Z_3$ are identical to or different from each other and are each independently N or $CR_4$ (where $R_4$ is hydrogen or $C_1$-$C_5$ alkyl), with the proviso that $Z_2$ and $Z_3$ are not simultaneously $CR_4$.

5. A method for fabricating the thermally rearranged poly(benzoxazole-co-imide) separation membrane according to claim 1, the method comprising i) reacting an acid dianhydride, an ortho-hydroxydiamine, and an aromatic diamine to obtain a polyamic acid solution, followed by azeotropic thermal imidization to synthesize a hydroxyl polyimide-co-polyimide, ii) dissolving the hydroxyl polyimide-co-polyimide in an organic solvent and electrospinning the polymer solution to obtain a hydroxyl polyimide-co-polyimide membrane, and iii) thermally rearranging the hydroxyl polyimide-co-polyimide membrane.

6. The method according to claim 5, wherein the ortho-hydroxydiamine used in step i) is represented by Formula 3:

<Formula 3>

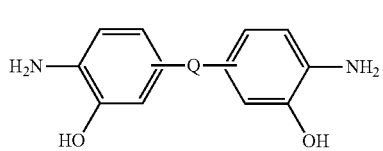

(wherein Q is as defined in Formula 1).

7. The method according to claim 5, wherein, in step i), the azeotropic thermal imidization is carried out in such a manner that toluene or xylene is added to the polyamic acid solution and the polyamic acid is subjected to an imidization reaction with stirring at 180 to 200° C. for 6 to 8 hours.

8. The method according to claim 5, further comprising ii)-(a) forming a coating layer of hydroxyl polyimide-co-polyimide nanoparticles after step ii).

9. The method according to claim 8, wherein the hydroxyl polyimide-co-polyimide nanoparticles are formed by dissolving a hydroxyl polyimide-co-polyimide and polyvinylpyrrolidone (PVP) or polyvinyl alcohol (PVA) as a dispersant in a solvent to obtain a polymer solution, dropping a non-solvent into the polymer solution, stirring the mixture, and depositing precipitates.

10. The method according to claim 9, wherein the solvent is selected from the group consisting of N-methylpyrrolidone (NMP), dimethylacetamide (DMAc), dimethylformamide (DMF), and dimethyl sulfoxide (DMSO).

11. The method according to claim 9, wherein the non-solvent is selected from the group consisting of water, methanol, ethanol, isopropyl alcohol, and acetone.

12. The method according to claim 9, wherein the polymer solution contains 2 to 5% by weight of the hydroxyl polyimide-co-polyimide.

13. The method according to claim 9, wherein the polymer solution contains 2 to 5% by weight of the polyvinylpyrrolidone (PVP) or polyvinyl alcohol (PVA).

14. The method according to claim 9, wherein the non-solvent is dropped at a rate of 0.05 to 1 mL/min.

15. The method according to claim 9, wherein the stirring rate is adjusted to 300 to 1,000 rpm.

16. The method according to claim 9, wherein the hydroxyl polyimide-co-polyimide nanoparticles are formed at 20 to 100° C.

17. The method according to claim 8, wherein the coating layer is formed by spray coating.

18. The method according to claim 5, wherein in step iii), the thermal rearrangement is performed by heating the hydroxyl polyimide-co-polyimide membrane to 350 to 450° C. at a rate of 3° C/min in a high-purity argon atmosphere and maintaining the temperature for 1 to 2 hours.

* * * * *